(12) United States Patent
Ohta et al.

(10) Patent No.: US 6,449,021 B1
(45) Date of Patent: Sep. 10, 2002

(54) INFORMATION PROCESSING APPARATUS, INFORMATION PROCESSING METHOD, AND DISTRIBUTION MEDIA

(75) Inventors: Masashi Ohta, Tokyo; Taro Suito, Kanagawa; Katsunari Miyata, Tokyo, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/448,837

(22) Filed: Nov. 23, 1999

(30) Foreign Application Priority Data

Nov. 30, 1998 (JP) .............................. 10-339273

(51) Int. Cl.[7] .............................. H04N 5/14; H04N 5/16; H04N 5/76
(52) U.S. Cl. ......................................... 348/700; 386/46
(58) Field of Search ................................ 348/699, 700, 348/533, 554, 571, 907; 386/46, 1, 45, 125, 83; 360/69, 71; 358/908; H04N 5/14, 5/16, 5/76

(56) References Cited

U.S. PATENT DOCUMENTS

| | | | |
|---|---|---|---|
| 5,151,788 A | 9/1992 | Blum | 358/188 |
| 5,333,091 A | 7/1994 | Iggulden et al. | 360/14.1 |
| 5,455,630 A | 10/1995 | McFarland et al. | 348/476 |
| 5,621,454 A * | 4/1997 | Ellis et al. | 348/2 |
| 5,692,093 A | 11/1997 | Iggulden et al. | 386/46 |
| 5,696,866 A | 12/1997 | Iggulden et al. | 386/46 |
| 5,959,697 A * | 9/1999 | Coleman, Jr. | 348/700 |
| 5,999,688 A * | 12/1999 | Iguldent et al. | 386/46 |
| 6,100,941 A * | 8/2000 | Dimitrova et al. | 348/700 |
| 6,275,646 B1 * | 8/2001 | Tada et al. | 386/46 |
| 6,285,818 B1 * | 9/2001 | Suito et al. | 386/46 |

* cited by examiner

*Primary Examiner*—Chris Kelley
*Assistant Examiner*—Tung Vo
(74) *Attorney, Agent, or Firm*—Oblon, Spivak, McClelland, Maier & Neustadt, P.C.

(57) ABSTRACT

An information processing apparatus capable of accurately detecting one or more commercials included in a television broadcast. A commercial candidate segment detector detects a commercial candidate segment on the basis of silent segments and scene change points. A commercial block detector detects a commercial block, which is composed of a plurality of commercial segments and is interposed between one program portion and another, in conformity with numbers of frames of the individual commercial candidate segments detected by the commercial candidate segment detector, and then outputs to a switch a control signal based on the result of such commercial block detection.

41 Claims, 29 Drawing Sheets

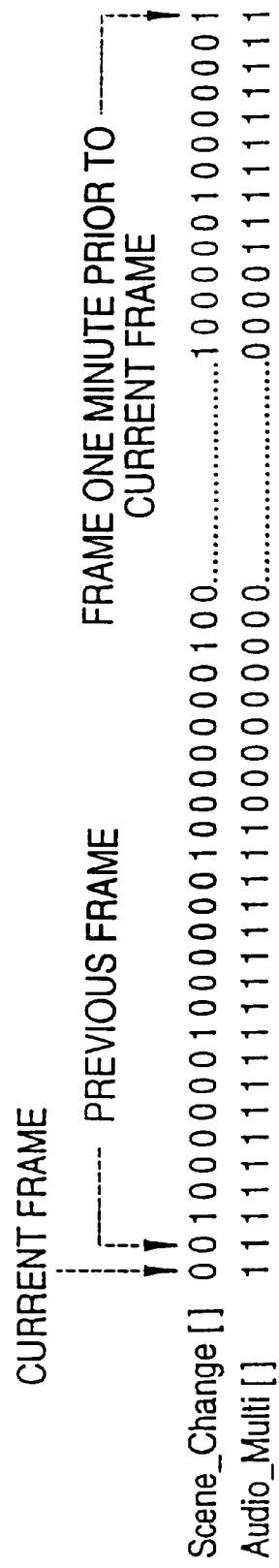

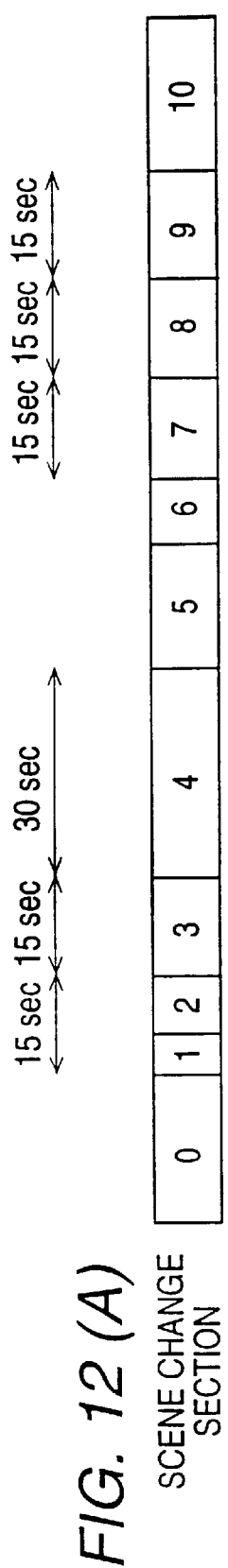
FIG. 12 (A) SCENE CHANGE SECTION
FIG. 12 (B) AUDIO MULTIPLEX MODE SECTION
FIG. 12 (C) CM CANDIDATE SECTION

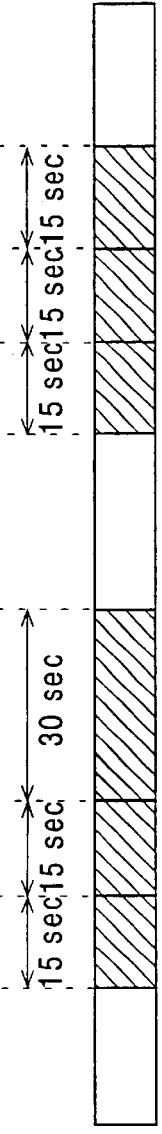
FIG. 14 (A) SOUNDLESS
FIG. 14 (B) SCENE CHANGE
FIG. 14 (C) (A) AND (C)
FIG. 14 (D) GROUPING
FIG. 14 (E) AUDIO MODE
FIG. 14 (F) CM CANDIDATE SECTION
FIG. 14 (G) CM JUDGEMENT RESULT

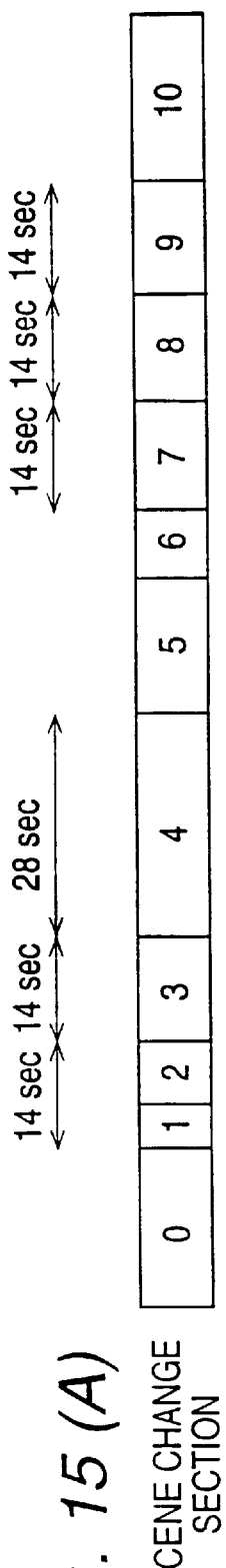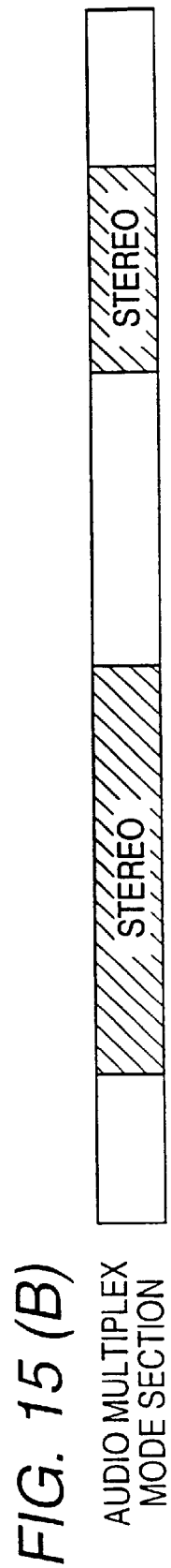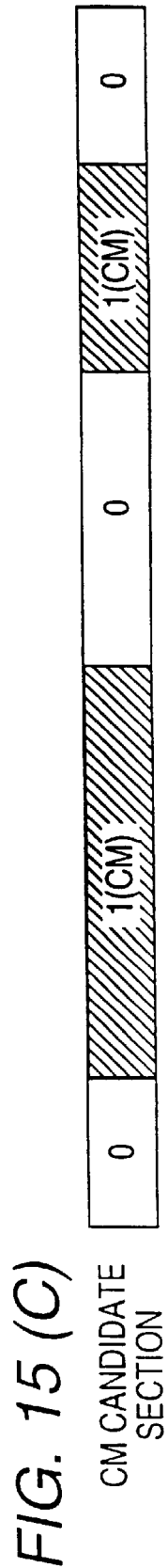
FIG. 15 (A) SCENE CHANGE SECTION
FIG. 15 (B) AUDIO MULTIPLEX MODE SECTION
FIG. 15 (C) CM CANDIDATE SECTION

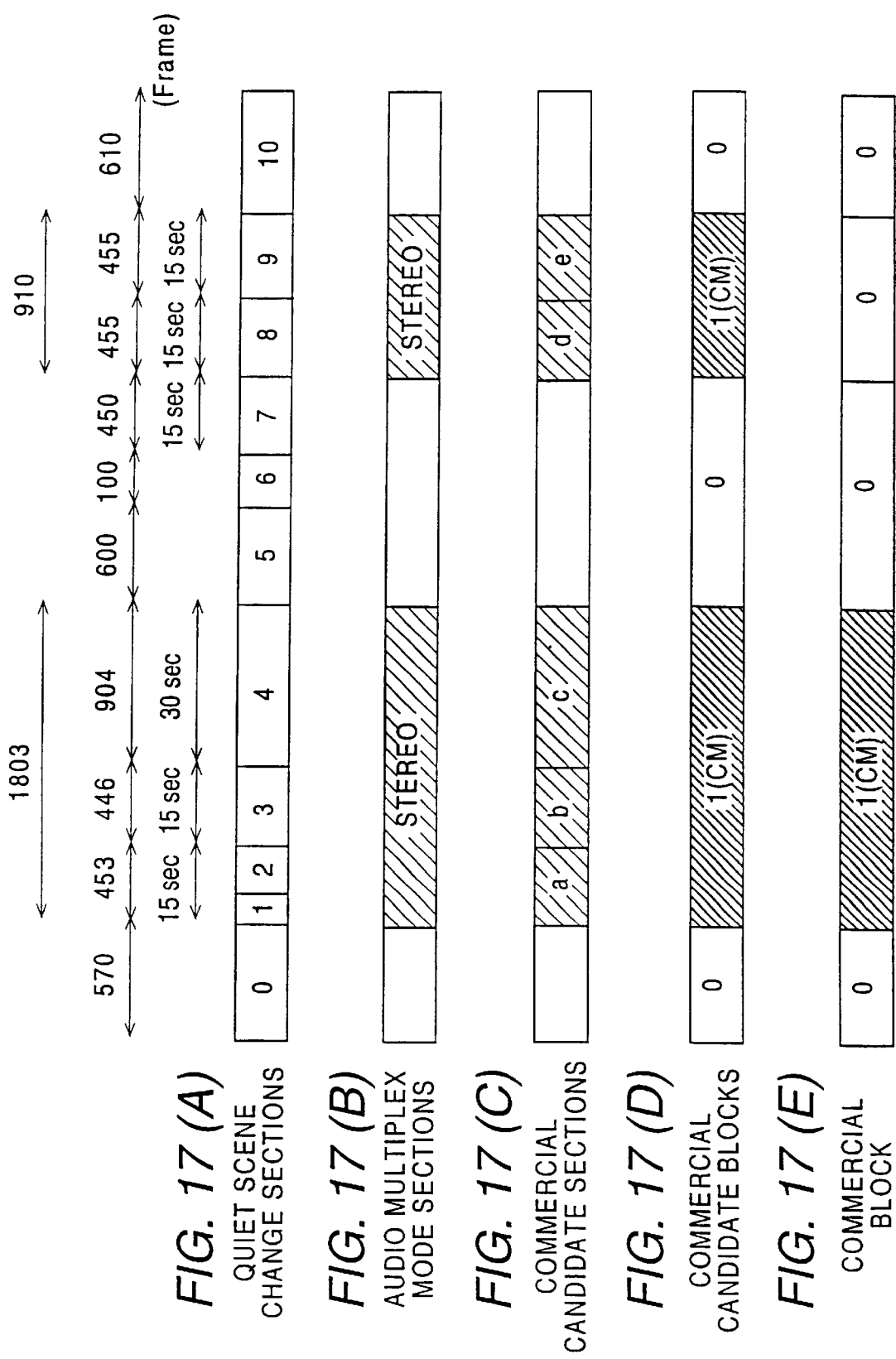

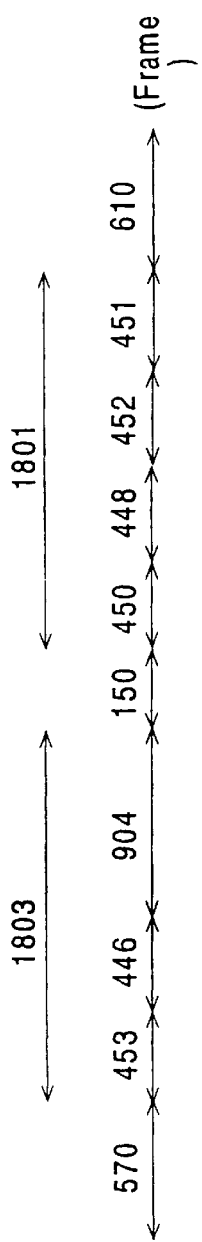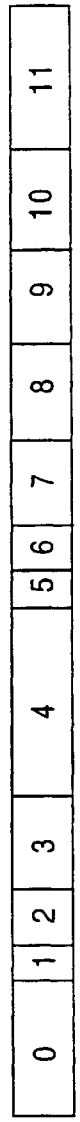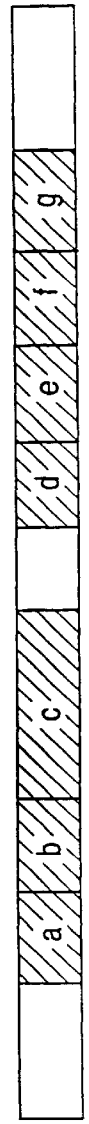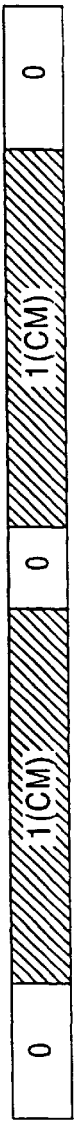
FIG. 18(A) QUIET SCENE CHANGE SECTIONS
FIG. 18(B) AUDIO MULTIPLEX MODE SECTIONS
FIG. 18(C) COMMERCIAL CANDIDATE SECTIONS
FIG. 18(D) COMMERCIAL CANDIDATE BLOCKS
FIG. 18(E) COMMERCIAL BLOCK 12 # INFORMATION PROCESSING APPARATUS, INFORMATION PROCESSING METHOD, AND DISTRIBUTION MEDIA

CROSS-REFERENCE TO RELATED APPLICATION

This application is related to U.S. patent application Ser. Nos. 08/448,836 and 09/447,496, both filed of even date herewith, both titled INFORMATION PROCESSING APPARATUS, INFORMATION PROCESSING METHOD, AND DISTRIBUTION MEDIA, both by the same co-inventors as in the present application, both assigned to the assignee of the present invention, and both of said applications are incorporated herein by reference.

BACKGROUND OF THE INVENTION

1. Field of the Invention

The present invention relates to an information processing apparatus, an information processing method, and distribution media, and more particularly to an information processing apparatus and a method for detecting commercials contained in television broadcasts, and distribution media.

2. Description of the Related Art

For example, to meet users' needs to sequentially view only programs when reproducing recorded television broadcasts, a video recorder (video cassette recorder) generally include a fast forward function to essentially skip over commercials. The fast forward function increases the speed at which magnetic tape within a video cassette is transferred from a supply reel to a take-up reel, to thereby reduce the time necessary to skip over undesired recorded sections of the recorded magnetic tape.

A commercial detecting algorithm used with such a video recorder is based on the characteristics of an absolute or vast majority of commercials as described below. More specifically, a portion in which the following characteristics are recognized is detected as a commercial: a silent segment of about 0.1 to 2.0 seconds exists at the start and end of a commercial; scene change points of an image exist in a silent segment; time required for a commercial is an integer multiple of 15 seconds; and commercials are broadcast when the sound multiplex mode is a stereo mode.

In television broadcasting in North America, commercials are detected based on the absolute condition that a black frame or blue frame exists between a program and a commercial.

Accordingly, according to the conventional commercial detecting algorithm, there has been a problem in that commercials not containing the above described characteristics, for example, such as commercials in the sound multiplex mode of monophonic mode, cannot be detected.

Also, according to the conventional commercial detecting algorithm, there has been a problem in that, if the above described characteristics were contained within a program, a portion of the program would be detected as a commercial.

Furthermore, there has been a problem in that commercials cannot be detected because of change or abolition of the commercial characteristics having been used in the conventional algorithm, for example, such as an integer multiple of 14 seconds as time required for a commercial, or abolition of the insertion of a black frame or blue frame in North American television broadcasts.

According to the conventional commercial detecting algorithm, to detect a silent segment, an average level of sound at a fixed segment is found and the segment is detected as a silent segment when the average level is below a predetermined threshold value. For this reason, there has been a problem in that the accuracy of detecting a silent segment differs between a bad reception state of television broadcasting, namely, a weak field with a bad S/N ratio of sound signal, and other than weak fields, with the result that commercials cannot be correctly detected.

According to the conventional commercial detecting algorithm, time required for a commercial is measured by counting frames, assuming that about 30 frames are produced per second. However, in actual broadcasting, since an error of about several frames arises, a margin corresponding to the error is provided for a threshold value for determining a required time. Accordingly, there has been a problem in that commercials are incorrectly detected or are not detected due to the margin.

Moreover, although advertising spots of television stations broadcast for about five seconds between a commercial and a program are like commercials to viewers, there has been a problem in that such advertising spots cannot be detected because they do not have the above described characteristics. The present invention has been made in view of such a situation.

SUMMARY OF THE INVENTION

It is an object of the invention to provide a method, apparatus and computer program for correctly detecting commercials contained in television broadcasts.

It is a further object of the present invention to reduce or eliminate the need to view commercials when reproducing previously recorded television broadcasts.

It is a feature of the present invention to stop recording of a television broadcast when a commercial is detected.

It is an additional feature of the present invention to instead index commercials when recording a television broadcast in order to permit the high speed fast forwarding through such commercials, yet preserve the ability to view such commercials according to the wishes of a viewer.

It is an advantage of the present invention to reduce the amount of time a viewer must spend in viewing a desired television program.

It is a further advantage of the present invention to reduce the amount of recording media storage space necessary to record a desired television program, by not recording commercials interspersed with the desired television program.

It is yet another advantage of the present invention to allow a viewer utilize indexing of commercials to permit the viewing of such commercials when desired by the viewer.

According to one aspect of the invention, there is provided an apparatus for processing a television signal, including means for receiving the television signal, means for detecting scene changes from said television signal, and means for detecting a commercial message according to a frequency of the scene changes.

According to another aspect of the invention, there is provided an apparatus for processing a television signal, including a tuner for receiving the television signal, a first detector for detecting scene changes from said television signal, and a second detector for detecting a commercial message according to a frequency of scene changes.

According to a further aspect of the invention, there is provided a method for processing a television signal, including the steps of receiving the television signal, detecting scene changes from said television signal, and detecting a commercial message according to a frequency of the scene changes.

According to yet another aspect of the invention there is provided a program storage device readable by a machine, tangibly embodying a program of instructions executable by the machine to perform method steps for processing a television signal, the method steps including receiving the television signal, detecting scene changes from said television signal, and detecting a commercial message according to a frequency of scene changes.

According to another aspect of the invention there is provided an apparatus for processing a television signal having a image signal and a sound signal, including means for determining a threshold indicating a silence in said sound signal, means for detecting a silent segment in the sound signal plurality of contiguous scenes based upon said threshold, means for detecting scene changes in said image signal, means for detecting commercial candidate segments based upon the detected silent segment, a frequency of the detected scene changes and a sound signal multiplex mode signal, and means for detecting which of the commercial candidate segments is a commercial based upon a rate of silence of the sound signal and a repetition of the image signal.

According to yet another aspect of the invention, there is provided an apparatus for processing a television signal having a image signal and a sound signal, including a determiner for determining a threshold indicating a silence in said sound signal, a first detector detecting a silent segment in the sound signal plurality of contiguous scenes based upon said threshold, a second detector for detecting scene changes in said image signal, a third detector for detecting commercial candidate segments based upon the detected silent segment, a frequency of the detected scene changes and a sound signal multiplex mode signal, and a fourth detector for detecting which of the commercial candidate segments is a commercial based upon a rate of silence of the sound signal and a repetition of the image signal.

According to yet another aspect of the invention, there is provided a method for processing a television signal having a image signal and a sound signal, including the steps of determining a threshold indicating a silence in said sound signal, detecting a silent segment in the sound signal plurality of continuous scenes based upon said threshold, detecting scene changes in said image signal, detecting commercial candidate segments based upon the detected silent segment, a frequency of the detected scene changes and a sound signal multiplex mode signal, and detecting which of the commercial candidate segments is a commercial based upon a rate of silence of the sound signal and a repetition of the image signal.

According to yet a further aspect of the invention, there is provided a program storage device readable by a machine, tangibly embodying a program of instructions executable by the machine to perform method steps for processing a television signal, the method steps including determining a threshold indicating a silence in said sound signal, detecting a silent segment in the sound signal plurality of continuous scenes based upon said threshold, detecting scene changes in said image signal, detecting commercial candidate segments based upon the detected silent segment, a frequency of the detected scene changes and a sound signal multiplex mode signal, and detecting which of the commercial candidate segments is a commercial based upon a rate of silence of the sound signal and a repetition of the image signal.

These and other objects, features and advantages will become apparent when considered with reference to the following description and the accompanying drawings.

BRIEF DESCRIPTION OF THE DRAWINGS

FIG. 11 is a diagram for explaining information stored in a memory internal to a commercial candidate segment detector 16.

FIGS. 12A to 12C are diagrams for explaining processing of the commercial candidate segment detector 16.

FIG. 14A to 14G are diagrams for explaining processing of the commercial candidate segment detector 16.

FIG. 15A to 15C are diagrams for explaining processing of the commercial candidate segment detector 16.

FIGS. 17A to 17E are diagrams for explaining processing of a commercial block detector 21 of FIG. 16.

FIGS. 18A to 18E are diagrams for explaining processing of the commercial block detector 21 of FIG. 16.

DESCRIPTION OF THE PREFERRED EMBODIMENTS

Figure 1:
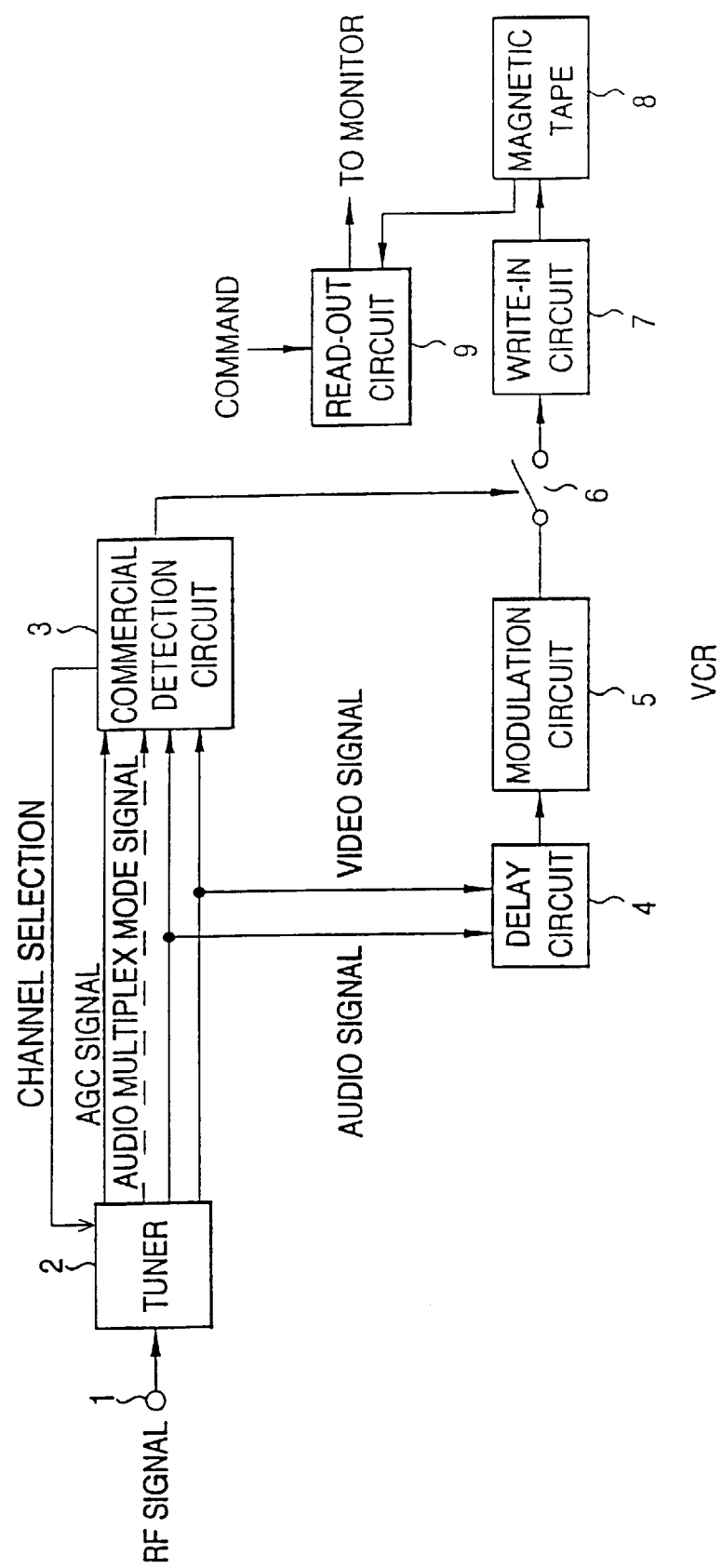
FIG. 1 is a block diagram showing a first embodiment of a video recorder to which the present invention is applied.

Hereinafter, embodiments of the present invention will be described. To clarify the correspondence between means of the present invention set forth in claims and embodiments described below, the characteristics of the present invention are described as shown below in a format that puts a corresponding embodiment (one example) within parentheses after each means. However, this representation does not mean that each means is limited to a described one. It is to be understood that the functions performed by various portions, circuits or units of the embodiments of the disclosed invention may be implemented as software, firmware, a hard wired circuit or a combination thereof. For example, a computer program may include program code adapted to enable a computer or other processor to perform all of the method steps described herein.

A first example of a video recorder to which the present invention is applied will be described with reference to FIG. 1. A tuner 2 in a recording system demodulates an RF signal of a television broadcast input from a terminal 1 and outputs an image signal, sound signal, AGC (automatic gain control) signal, and signal indicating the sound multiplex mode (hereinafter referred to as a sound multiplex mode signal) to a commercial detector 3. The term "commercial" is also referred to in the drawings by the abbreviation "CM". The tuner 2 outputs the image signal and sound signal to a delay circuit 4.

The commercial detector 3 judges whether the signals input from the tuner 2 indicate a commercial, and according to the result, outputs 0 (a low signal) or 1 (a high signal) to a switch 6 as a control signal. The switch 6 is turned off when the control signal is 1, and is turned on when the control signal is 0.

A delay circuit 4 delays the image and sound signals input from the tuner 2 for the time (1 minute in the embodiment) required for processing of the commercial detector 3 before outputting them to a modulating circuit 5. The modulating circuit 5 compresses and encodes the image signal and sound signal input from the delay circuit 4 by a predetermined system (e.g., MPEG2 system), modulates them by a predetermined modulating method (e.g., EFM modulation), and outputs a modulated signal to a write circuit 7 via the switch 6. The write circuit 7 records the input modulated signal onto a magnetic tape 8.

A read circuit 9 in a reproduction system, in response to a command input from a user, reads and demodulates signals recorded on the magnetic tape 8, and supplies them to a monitor (not shown).

Media for recording image signals and sound signals may instead of a magnetic tape be an optical disk, a magneto-optic disc, a hard disk, a semiconductor memory or any other recording media.

Figure 2:
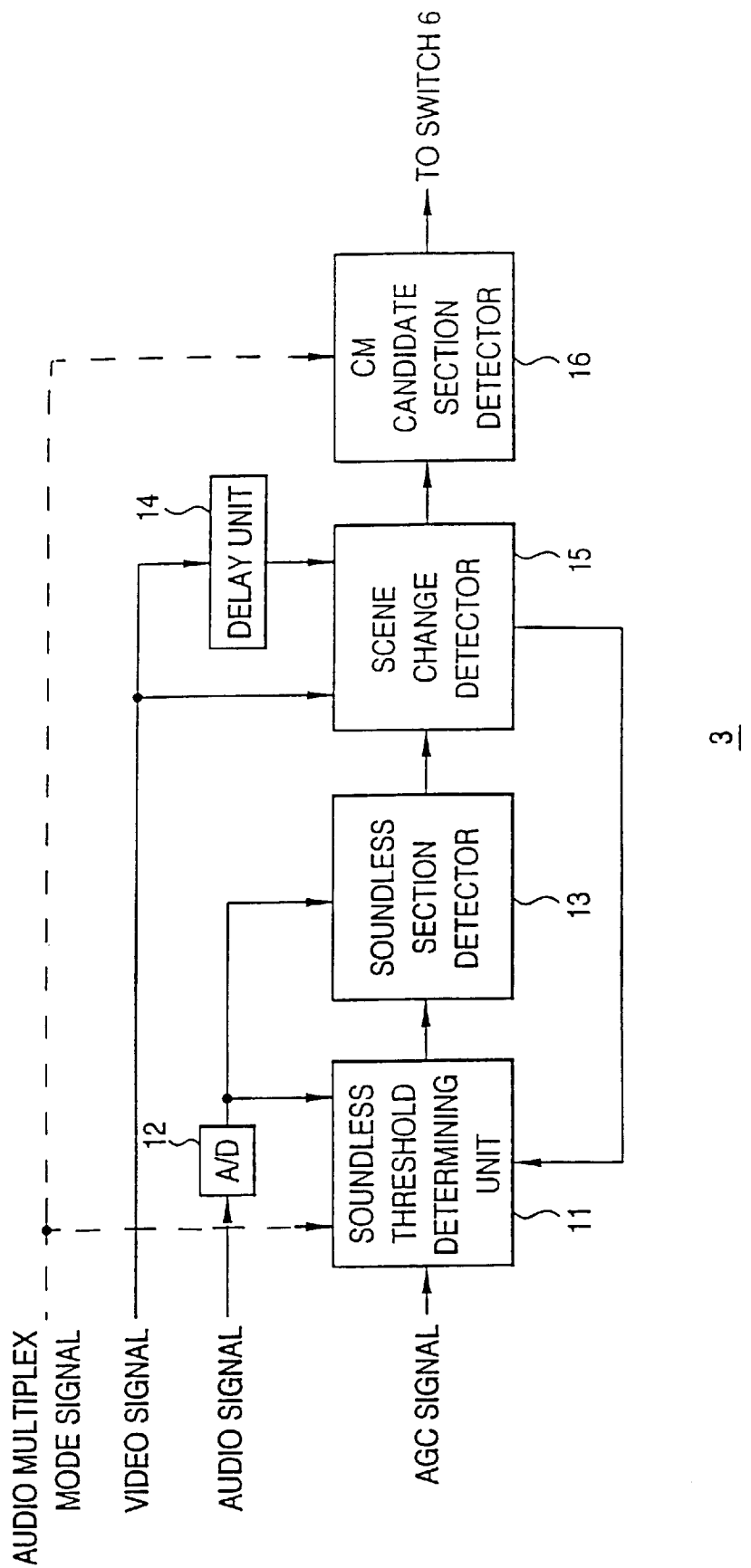
FIG. 2 is a block diagram showing a first embodiment of a commercial detector 3 of FIG. 1.

FIG. 2 shows a first embodiment and search for configuration of the commercial detector 3 of FIG. 1. In the commercial detector 3, sound multiplex mode signals input from the tuner 2 are supplied to a silence threshold determiner 11, image signals are supplied to the delay unit 14 and the scene change detector 15, sound signals are supplied to the A/D converter 12, and AGC signals are supplied to the silence threshold determiner 11. The silence threshold determiner may be implemented by way of a circuit, by way of software and a microprocessor, and a combination of both.

The silence threshold determiner 11 uses one of a sound multiplex mode signal, a sound signal digitized in the A/D converter 12, an AGC signal, a search and a signal input from the scene change detector 15 to calculate a threshold value used in silent segment detection processing, and supplies it to a silent segment detector 13.

The silent segment detector 13 compares the level of the digitized sound signal input from the A/D converter 12 and the threshold value supplied from the silence threshold determiner 11 to detect a silent segment, and outputs the result to the scene change detector 15.

The scene change detector 15 compares two frame images (a current frame and a related frame delayed for one frame time (1/30 seconds) by the delay unit 14 input at the same time to detect the existence of a scene change in a silent segment, and outputs the result to the commercial candidate segment detector 16.

The commercial candidate segment detector 16 binarizes the sound multiplex mode signal and scene change information supplied from the scene change detector 15 on a frame basis, stores the results in an internal memory, detects a commercial candidate segment based on the information, and outputs control signal of 1 to the switch 6 for a commercial candidate segment and 0 a control signal of for other than a commercial candidate segment. Information of the past minute is stored in a memory internal to the commercial candidate segment detector 16. In this case, the capacity of the internal memory is 60 (seconds)×30 (frames)×2 (data)×1 (bit).

Next, the operation of the commercial detector 3 will be described with reference to the flowchart of FIG. 3. The commercial detection processing is started when signals are input to the commercial detector 3 from the tuner 2. In step S1, the silence threshold determiner 11 of the commercial detector 3 outputs a threshold value calculated in advance (described later herein), used in silent segment detection processing (step S2), to the silent segment detector 13.

Figure 4:
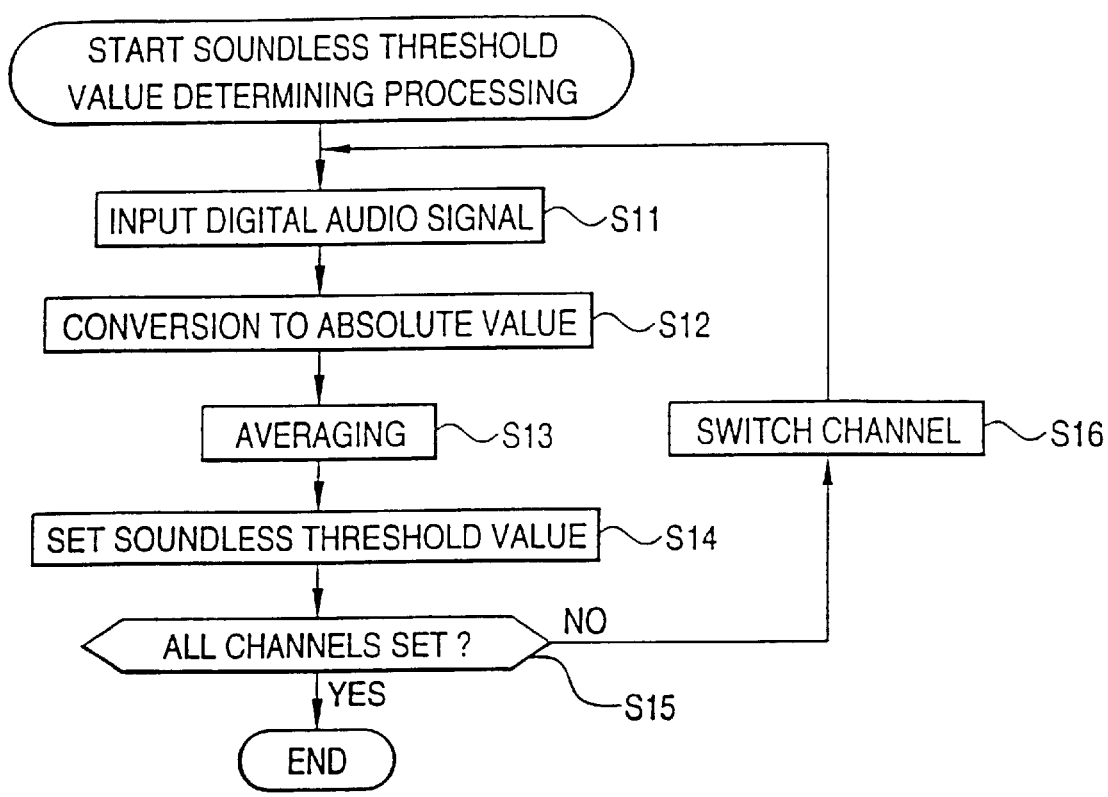
FIG. 4 is a flowchart for explaining processing of a silence threshold determiner 11 of FIG. 2.
Figure 5:
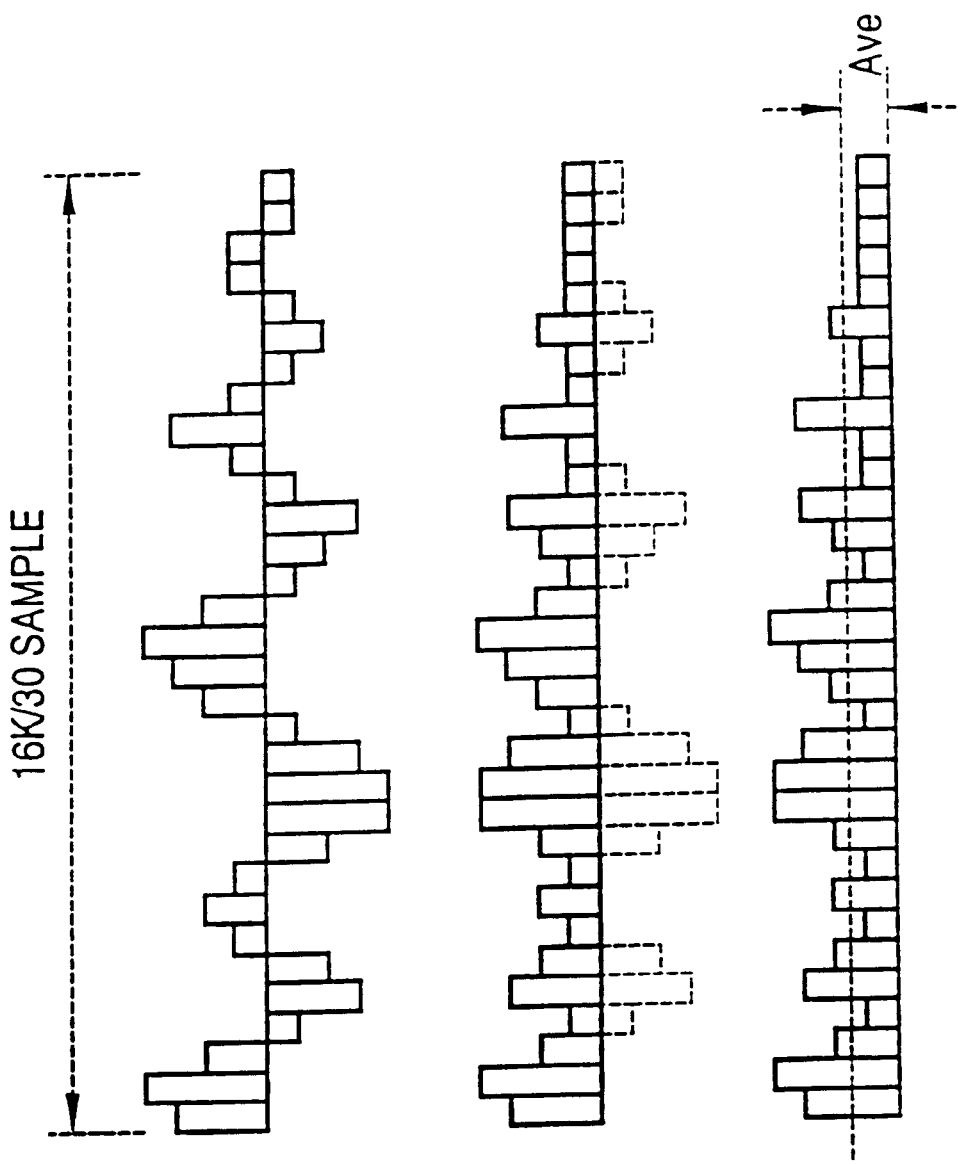
FIGS. 5A to 5C are diagrams for explaining the operation of the silence threshold determiner 11 of FIG. 2.

Herein, silence threshold determination processing will be described in detail with reference to the flowchart of FIG. 4. In step S11, the A/D converter 12 digitizes a sound signal (analog) of a predetermined short time input from the tuner 2 at a predetermined sampling frequency and a predetermined quantization level, and outputs a digital sound signal (e.g., FIG. 5A) to the silence threshold determiner 11. The silence threshold determiner 11, in step S12, transforms the digital sound signal input from the A/D converter 12 into absolute values as shown in FIG. 5B, and in step S13, calculates an average value (FIG. 5C) of levels of the sample transformed into the absolute values.

In step S14, the silence threshold determiner 11 compares the average value obtained in step S13 and a threshold value having been stored until now, and stores the smaller of them as a new threshold value.

In step S15, the silence threshold determiner 11 judges whether processing of steps S11 to S14 has been performed for all channels, and proceeds to step S16 if it is judged that the processing has not been performed for all channels. In step S16, the remaining channels are successively processed.

Thereinafter, in step S15, if it is judged that processing of steps S11 to S14 has been performed for all channels, the silence threshold determination processing terminates. The silence threshold determination processing is always performed repeatedly at a predetermined interval (e.g., every 10 minutes).

Alternatives to the above described method of silence threshold determination processing are possible. For example, it is possible to receive a sound signal at broadcast start and end times of each channel when an image signal exists.but the level of the sound signal always becomes 0, and define the level n plus a predetermined offset value Δ (n+Δ) as a silence threshold value. However, the broadcast start and end times of each channel should be already known.

Figure 6:
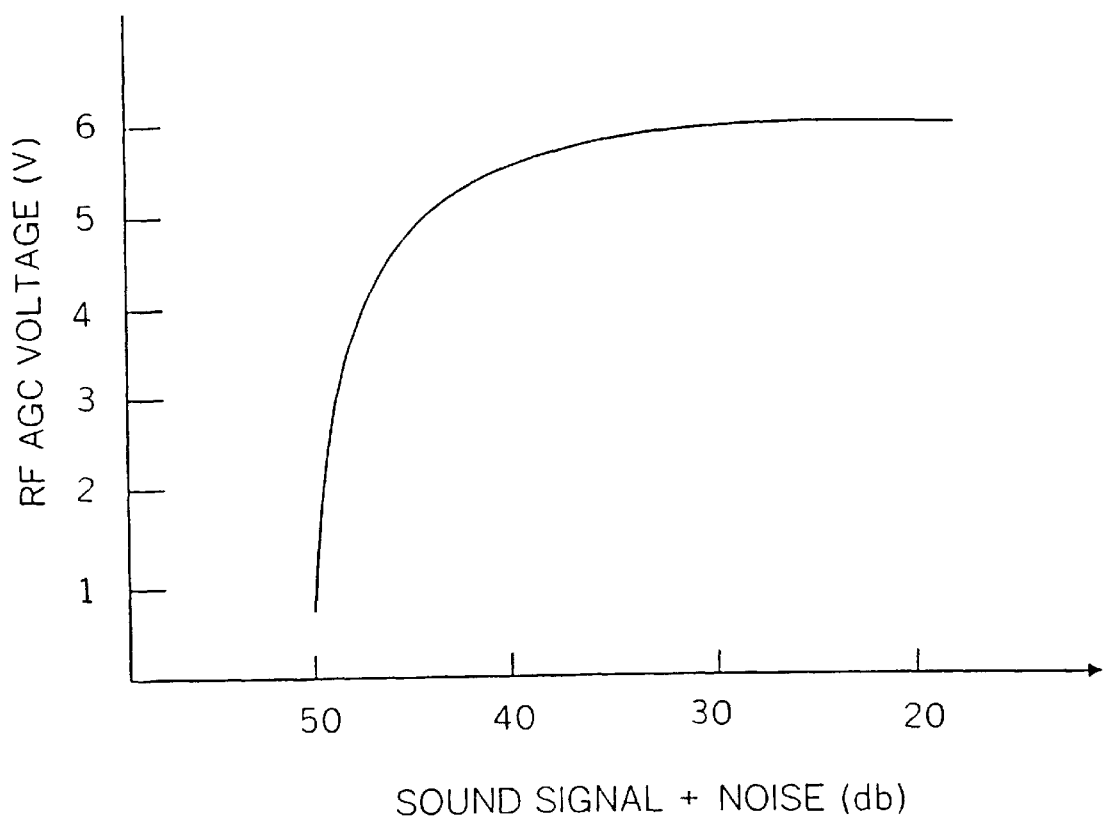
FIG. 6 is a diagram for explaining the operation of the silence threshold determiner 11 of FIG. 2.

A silence threshold value may be determined using an AGC signal from the tuner 2. That is, the level of the AGC signal from the tuner 2 is to the level of the sound signal+ noise in decibels (DB), as shown in FIG. 6. Accordingly, by estimating the level of the sound signal+noise of a sound signal from the level of the AGC signal, a threshold value corresponding to the estimated level can be uniquely determined.

Figure 7:
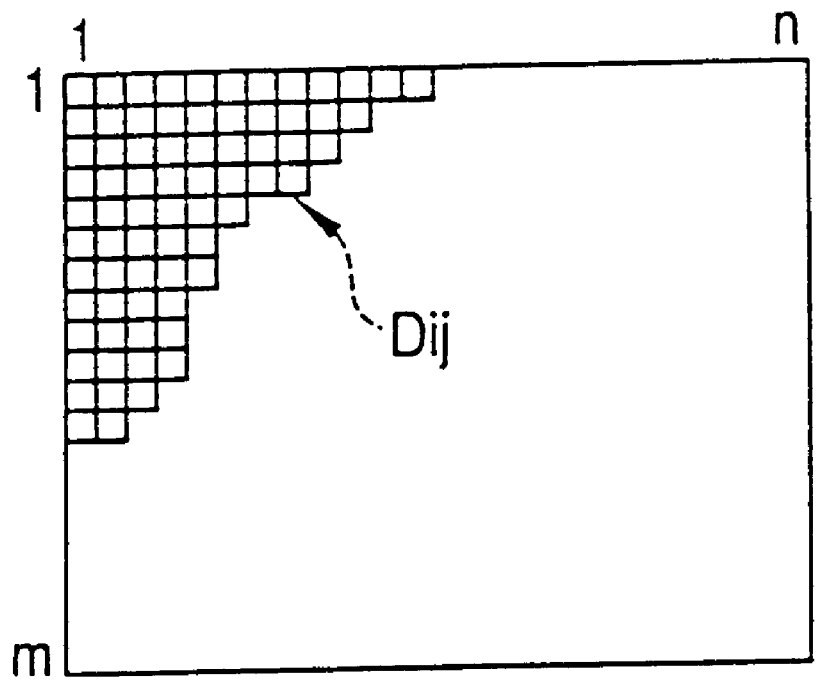
FIG. 7 is a diagram for explaining the operation of the silence threshold determiner 11 of FIG. 2.

Moreover, since buzz components of a sound signal depend on brightness levels of an image signal, a silence threshold value may be determined using the average of brightness levels of an image signal. Typical NTSC television broadcast signals include an amplitude modulated image signal and a frequency modulated sound signal. Buzz components appear when a portion of the image signal is demodulated by the sound signal demodulator or detector. This condition occurs because of non-linearity of the image intermediate frequency (IF) circuit. In the case where the image signal brightness level is high and the level of the sound signal is low, the buzz components will be more noticeable. In general, the buzz component are a function of the vertical synchronization signal, which in standard NTSC format, has.a frequency of 60 HZ. Therefore, because of non-linearities in the television circuitry, the frequency of the buzz components are at 60 Hz and harmonics thereof. In further detail, if the average of brightness levels is high, since buzz components of a sound signal increase, resulting in that the level of the sound signal at a fixed period becomes high, a threshold value is set higher than normal, while if the average of brightness levels is low, since buzz components of a sound signal decrease, resulting in that the level of the sound signal at a fixed period becomes low, a threshold value is set lower than normal. The average $Y_A$ of brightness levels of an image signal is calculated as shown by the following expression in the scene change detector 15.

$$Y_A = (\Sigma Dij)n \times m$$

where i is from 1 to n and j is from 1 to m, and Dij is the pixel value of coordinates (i, j) of an image corresponding to a sound signal, as shown in FIG. 7.

Moreover, a silence threshold value may be determined based on a sound multiplex mode signal. That is, the level of a sound signal when the sound multiplex mode changes from a bilingual broadcast to a stereo broadcast may be defined as a silence threshold value.

Figure 8:
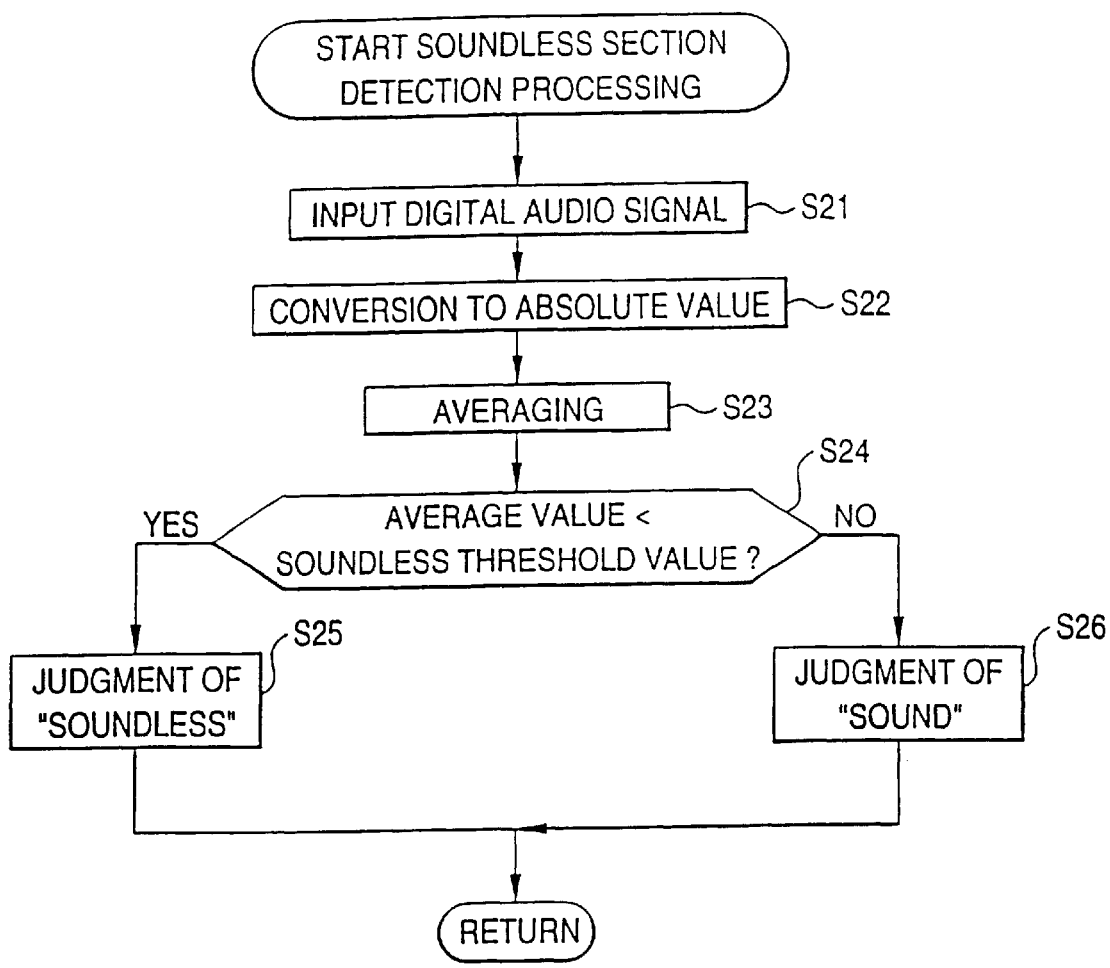
FIG. 8 is a flowchart for explaining silent segment detection processing of step S2 of FIG. 3.

Returning again to FIG. 3, in step S2, the silent segment detector 13 detects a silent segment based on a threshold value input from the silence threshold determiner 11 in step S1. The silent segment detection processing will be described in detail with reference to the flowchart of FIG. 8.

In step S21, the A/D converter 12 digitizes a sound signal (analog) of a predetermined short time input from the tuner 2 at a predetermined sampling frequency and a predetermined quantization level, and outputs an obtained digital sound signal (e.g., FIG. 5A) to the silence threshold determiner 11. The silence threshold determiner 11, in step S22, transforms the digital sound signal input from the A/D converter 12 into absolute values as shown in FIG. 5B, and in step S23, calculates an average value (FIG. 5C) of levels of the sample transformed into absolute values.

In step S24, the silence threshold determiner 11 judges whether the average value obtained in step S23 is smaller than a threshold value input from the silence threshold determiner 11, and proceeds to step S25 if it judges that the average value is smaller than the threshold value. In step S25, the silent segment detector 13 judges that the segment is a silent segment, and outputs information indicating the fact to the scene change detector 15.

To the contrary, in step S24, if it is judged that the average value is not smaller than the threshold value, control goes to step S26. The silent segment detector 13 judges that the segment is not a silent segment (therefore a noisy segment), and outputs information indicating the fact to the scene change detector 15.

Figure 3:
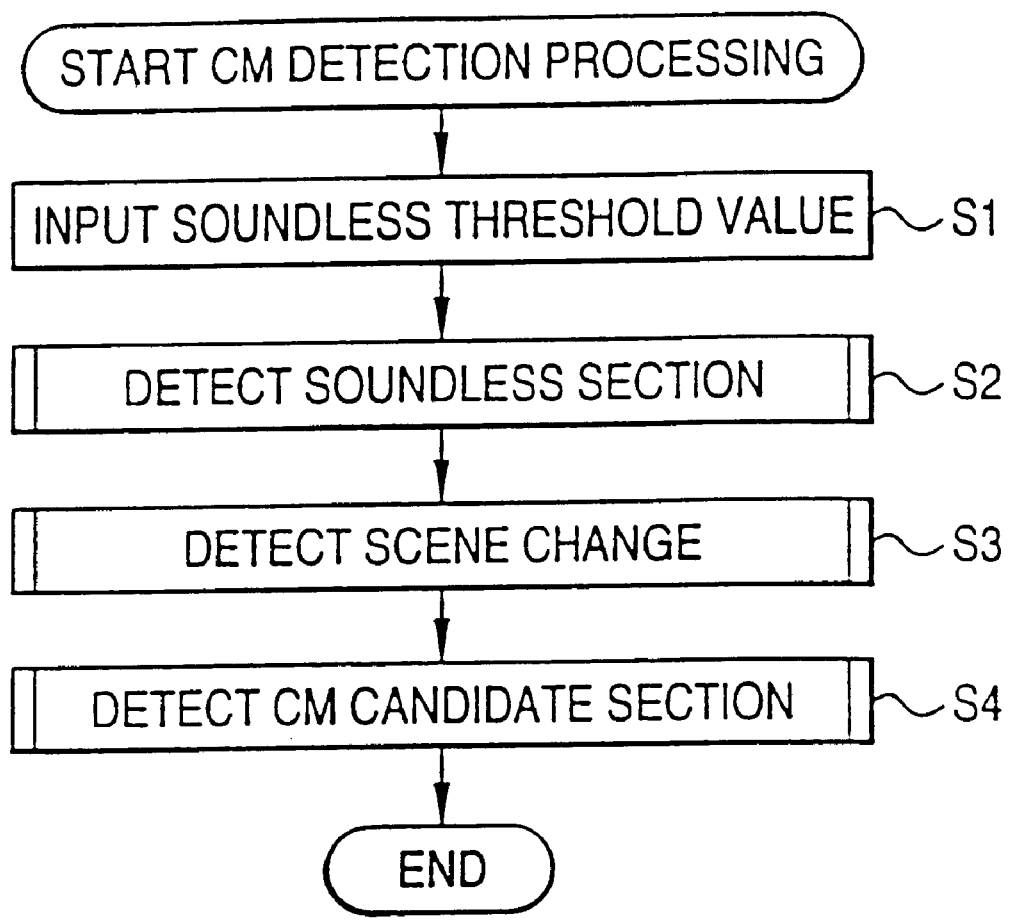
FIG. 3 is a flowchart for explaining the operation of the commercial detector 3.
Figure 9:
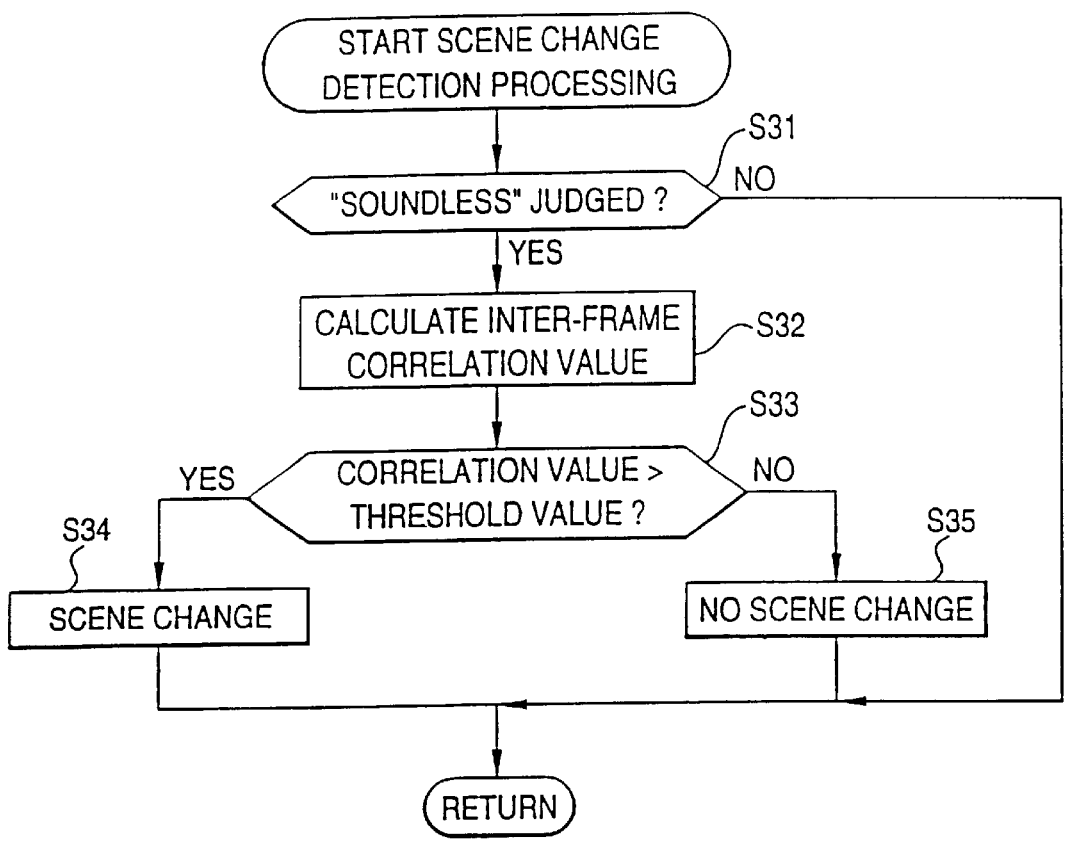
FIG. 9 is a flowchart for explaining scene change detection processing of step S3 of FIG. 3.

Control returns to step S3 of FIG. 3. In step S3, the scene change detector 15 detects a scene change with respect to two successive frames and outputs the result to the commercial candidate segment detector 16. The scene change detection processing will be described in detail with reference to the flowchart of FIG. 9.

In step S31, the scene change detector 15 judges whether information input from the silent segment detector 13 indicates a silent segment, and proceeds to step S32 if it judges that the input information indicates a silent segment.

Figure 10:
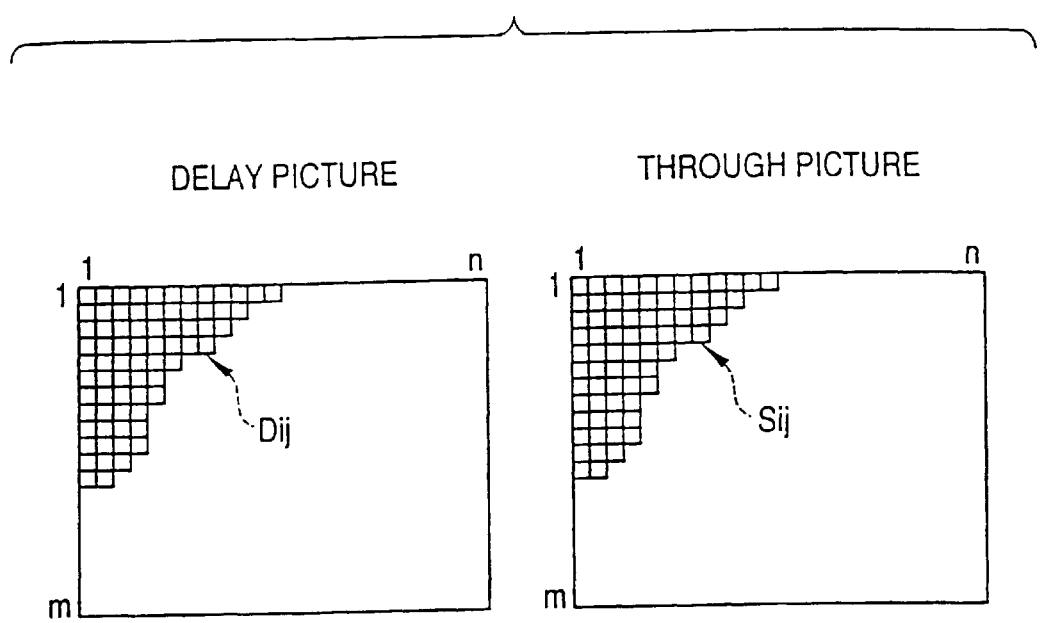
FIG. 10 is a diagram for explaining. scene change detection processing.

In-step S32, the scene change detector 15 calculates a correlation value E between the two input successive frame images. Specifically, as shown in FIG. 10, the sum of the absolute values of the differences between the pixel values of corresponding pixels between an image (delay image) input via the delay unit 14 and an image (through image) input without going through the delay unit 14 is calculated as a comparison value by the following expression.

$$E = \Sigma |Dij - Sij|$$

where Dij and Sij denote the pixel value of coordinates (i, j) of a delay image and the through image, respectively. The comparison value is larger for a lower correlation between frames, and is smaller for a higher correlation between frames.

By the way, other methods of calculating a comparison value E may include a method of using a histogram of pixel values of delay images and through images, and a method of splitting delay images and through images into predetermined blocks and calculating the differences between pixel values as a correlation value on a block basis.

In step S33, the scene change detector 15 judges whether a comparison value obtained in step S32 is greater than a predetermined threshold value, and proceeds to step S34 if it judges that the comparison value is greater than the predetermined threshold value (i.e., where the correlation between the frames is low).

In step S34, the scene change detector 15 judges that a scene change exists between two input successive frames, and outputs information indicating the fact to the commercial candidate segment detector 16.

To the contrary, if it is judged in step S33 that the comparison value is not greater than the predetermined threshold value (i.e., that the correlation between the frames is high), control goes to step S35.

In step S35, the scene change detector 15 judges that no scene change exists between two input successive frames, and outputs information indicating the fact to the commercial candidate segment detector 16.

If it is judged in step S31 that information input from the silent segment detector 13 does not indicate a silent segment, the information is output to the commercial candidate segment detector 16, and control returns to step S4 of FIG. 3.

In step S4, the commercial candidate segment detector 16 judges a commercial candidate segment based on binarized sound multiplex mode signals and information from the scene change detector 15, having been stored on a frame basis in the internal memory from one minute before.

Specifically, in the memory internal to the commercial candidate segment detector 16, as shown in FIG. 11, sound multiplex mode signals (Audio$_{13}$Multi[ ]) are recorded in a manner that designates the stereo mode with 1 and monophonic mode and the bilingual mode with 0, and information (Scene$_{13}$Change[ ]) input from the scene change detector 15 is recorded in a manner that designates scene change frames with 1 and other than scene change frames with 0. It is to be understood that in countries such as Japan commercials are broadcast in stereo mode, whereas sponsored programs are broadcast in monophonic or in bilingual mode (also known as SAP or secondary audio program). In the United States of America, however, both commercials and sponsored programs are generally broadcast in stereo mode if the such commercials and sponsored programs are produced with stereo sound. Therefore, for use with broadcasts made within the United States of America, step S4 it may be preferable to not judge a commercial candidate segment based upon the binarized sound multiplex mode signals.

The commercial candidate segment detector 16 references the internal memory, and as shown in FIG. 12A, creates a segment (scene change segments 0 to 10 in this example) each time a frame (scene change point) having a scene change signal of 1 appears, and divides the number of frames making up each scene change segment by 30, thereby calculating time of the segment. The commercial candidate segment detector 16, as shown in FIG. 12B, defines successive frames having a sound multiplex mode signal of 1 as a stereo segment. Moreover, the commercial candidate segment detector 16, as shown in FIG. 12C, if time of a single scene change segment or the total time of two or more adjacent scene change segments is an integer multiple of 15 seconds and the segments are stereo segments, judges the segments as commercial candidate segments, and outputs a control signal of 1 to the switch 6 for commercial candidate segments and a control signal of 0 to the switch 6 for other than commercial candidate segments.

The switch 6 is turned off when the control signal is 1, and is turned on when 0. To the switch 6 are input from the modulating circuit 5 a modulated image signal and a sound signal that are synchronous with a control signal from the commercial candidate segment detector 16 due to a delay of one minute in the delay circuit 4. Accordingly, the subsequent stage of the switch 6 is supplied with only image signals and sound signals of a program, and not with image signals and sound signals of commercial candidate segments. Therefore, only programs are recorded on the magnetic tape 8.

Next, an another example of the operation of the commercial candidate segment detector 16 will be described. This example, which is not representative of absolute characteristics of commercials, adds general tendencies of commercials (scene changes take place multiple times in a commercial) to conditions for detecting commercial candidate segments.

Figure 13:
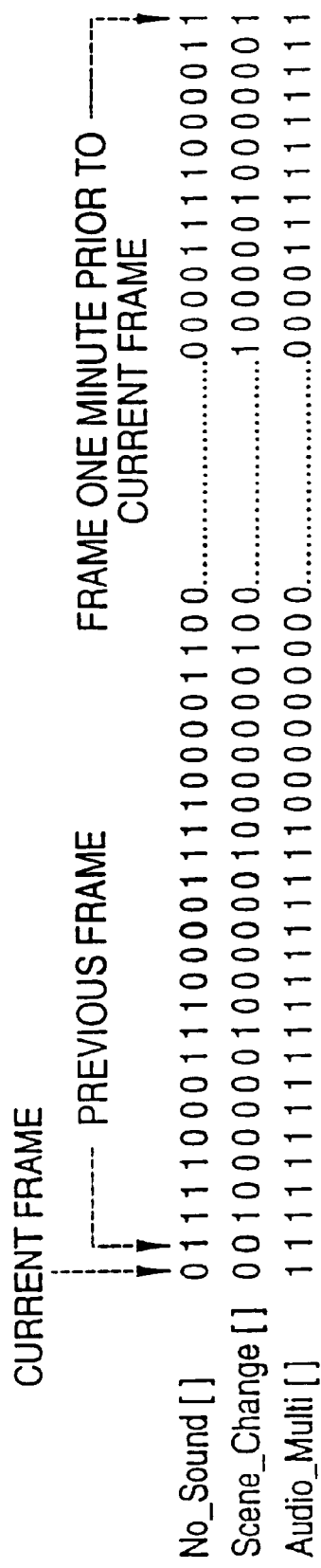
FIG. 13 is a diagram for explaining information stored in the memory internal to the commercial candidate segment detector 16.

In this example, in the memory internal to the commercial candidate segment detector 16, as shown in FIG. 13, in addition to the information shown in FIG. 11, information (No_Sound[ ]) (0 for noisy segments and 1 for silent segments) indicating silent segments, which is output from the silent segment detector 13, is recorded. In this case, a required capacity of the internal memory is:

60 (seconds)×30 (frames)×3 (data)×1 (bit)

The commercial candidate segment detector 16 references the internal memory, detects silent segments as shown in FIG. 14A, detects scene change points as shown in FIG. 14B, creates a scene change segment (scene change segments 0 to 10 in FIG. 14C) each time the scene change points appear in the silent segments as shown in FIG. 14C, and divides the number of frames making up each scene change segment by 30, thereby calculating time of the segment.

The commercial candidate segment detector 16, as shown in FIG. 14D, groups scene change segments so that time of a single scene change segment or the total time of two or more adjacent scene change segments is an integer multiple of 15 seconds, detects segments having a sound multiplex mode signal of 1 as shown in FIG. 14E, groups the segments so that time of the segments is an integer multiple of 15 seconds as shown in FIG. 14F, and judges the grouped stereo segments (segments a to c, and segments d and e in this example) as commercial candidate segments. Moreover, the commercial candidate segment detector 16, as shown in FIG. 14G, compares the number of scene changes in commercial candidate segments (commercial candidate segments a, c, d, and e in this example) in each end of adjacent commercial candidate segments with a predetermined threshold value (e.g., 1), and judges as commercial candidate segments the commercial candidate segments (commercial candidate segments a and c in this example) in which the number of scene changes is greater than the threshold value. The commercial candidate segment b surrounded by the-commercial candidate segments a and c is also judged as a commercial segment.

The commercial candidate segment detector 16 outputs a control signal of 1 to the switch 6 for commercial candidate segments-and a control signal of 0 to the switch 6 for other than commercial candidate segments.

Next, a further another example of the operation of the commercial candidate segment detector 16 will be described. This example, when absolute characteristics of commercial are changed (for example, commercial time is changed from an integer multiple of 15 seconds to an integer multiple of 14 seconds), changes a reference value used to judge commercial candidate segments to meet the change of characteristics.

In this operation example, the commercial candidate segment detector 16 references the internal memory (FIG. 11), and as shown in FIG. 15A, creates a scene change segment (scene change segments 0 to 10 in this example) each time a frame (scene change point) having a scene change signal of 1 appears, and divides the number of frames making up each scene change segment by 30, thereby calculating time of the segment. The commercial candidate segment detector 16, as shown in FIG. 15B, defines successive frames having a sound multiplex mode signal of 1 as a stereo segment.

Herein, the commercial candidate segment detector 16 compares time of a stereo segment with time of a non-stereo segment adjacent to the stereo segment, and if the time of the stereo segment is sufficiently short, judges the stereo segment (e.g., scene change segments 1 to 4, and scene change segments 8 and 9) as a commercial candidate segment.

Next, the commercial candidate segment detector 16, since the total time of commercial candidate segments (scene change segments 1 to 4) is 56 seconds, judges that the unit of commercial time is 7, 14, or 28 seconds, and finally judges that commercial time is an integer multiple of 14 seconds because scene changes are made at intervals of 14 or 28 seconds.

If the above result (commercial time is judged to be an integer multiple of 14 seconds) is obtained continuously a predetermined number of times or more, the commercial candidate segment detector 16 judges that commercial time has been changed to an integer multiple of 14 seconds, and thereafter uses an integer multiple of 14 seconds as a reference value for detecting commercial segments.

If absolute characteristics of commercial have been changed (the above described change of commercial time, the abolition of insertion of black frames and blue frames in North American television broadcasts, etc.), a reference value for detecting commercial segments, changed to meet the changed absolute characteristic, may be supplied to the commercial candidate segment detector 16 from the outside of the apparatus. In this case, in the commercial candidate segment detector 16, a reference value for detecting commercial segments should be stored in an erasable storage medium such as flash memory.

Figure 16:
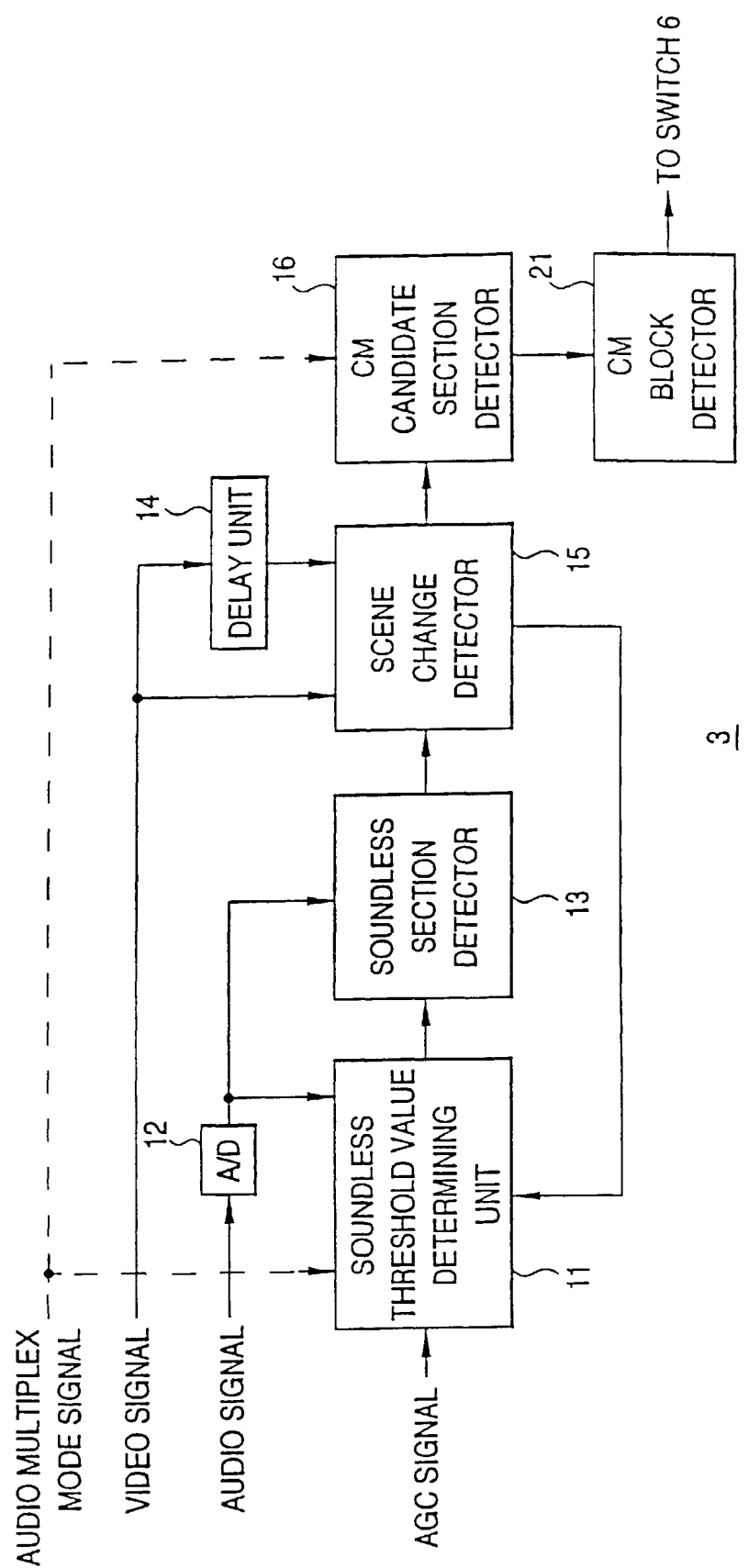
FIG. 16 is a block diagram showing a second embodiment of the commercial detector 3 of FIG. 1.

A second embodiment of the commercial detector 3 will be described with reference to FIG. 16. In this second embodiment, the commercial block detector 21 is added to the configuration example shown in FIG. 2. The commercial block detector 21 uses the number of frames of a single commercial candidate segment detected in the commercial candidate segment detector 16 to detect a commercial block consisting of a plurality of commercials surrounded by programs, and outputs a control signal to the switch 6 based on the result.

According to this second embodiment a commercial block can be detected using the commercial characteristics described below. That is, when a plurality of commercials are broadcast continuously, although individual commercials have an error of about five frames with respect to a standard number of frames, a commercial block has an error of about three frames with respect to a standard number of frames. For example, when four commercials of 15 seconds each are broadcast continuously, although the number of frames of individual commercials is 450±5 (=15×30±5), the number of frames of a commercial block is 1800±3, not 1800±20 (=15×4×30±5×4).

Next, the operation will be described with reference to FIGS. 17A–17E and 18A–18E. It is to be understood that the use of the sound multiplex mode is an optional part of the method of detecting commercial candidate segments and/or commercial candidate blocks. The commercial block detector 21 reads the number of each of commercial candidate segments (silent scene change segments 1+2, 3, 4, 8, and 9 of FIG. 17A) detected by the commercial candidate segment detector 16, sums the numbers of frames of adjacent commercial candidate segments, and judges whether the total value fits within a permissible range (±3) of the above described error. As shown in FIGS. 17C and 17D, commercial candidate segments a, b and c form commercial candidate block A, and commercial candidate segments form commercial candidate block B. If the commercial block detector 21 judges that the total frame count fits within the permissible range of the error, it judges that the adjacent commercial candidate segments are a commercial block. To the contrary, if it judges that the total frame count does not fit within the permissible range, it judges that the adjacent commercial candidate segments are not a commercial block.

In this case, as shown in FIG. 17E, the sum of the numbers of frames of adjacent commercial candidate segments (scene change segments 1 to 4) is 1803 (=453+446+904), and an error (±3) with respect to a standard number of frames 1800 (=60 seconds×30 frames) is within the permissible range. Therefore, it is judged that the adjacent commercial candidate segments, scene change segments 1 to 4 (commercial candidate block A), are a commercial block.

On the other hand, the sum of the numbers of frames of adjacent commercial candidate segments (scene change segments 8 and 9) is 910 (=455+455) and an error (10) with respect to a standard number of frames 900 (=30 seconds×30 frames) is out of the permissible range. Therefore, it is judged that the adjacent commercial candidate segments, scene change segments 8 and 9 (commercial candidate block B), are not a commercial block as shown in FIG. 17E.

With reference now to FIGS. 18A and 18C, when commercial candidate segments a, b, c, d, e, f and g as shown in FIG. 18C are input from the commercial candidate segment detector 16, the commercial block detector 21 judges that the scene change segments 1 to 4 and scene change segments 7 to 10 are commercial blocks A and B, respectively, as shown in FIG. 18D, similar to the case described above with reference to FIG. 17D.

Furthermore, the commercial block detector 21 reads from the commercial candidate segment detector 16 the number of frames of segments (scene change segments 5 and 6) surrounded by the commercial blocks A and B that are not commercial candidate segments as shown in FIG. 18D. If the number of frames (150 in this case) is smaller than or equal to a predetermined threshold value (e.g., 300 frames (10 seconds)), the commercial block detector 21 judges that the segments are not a program but like a commercial to users, and includes them in the surrounding commercial blocks A. and B. That is, the commercial block detector 21, as shown in FIG. 18E, judges the scene change segments 1 to 10 as one commercial block.

The commercial block detector 21 outputs a control signal of 1 for commercial blocks and a control signal of 0 to the switch 6 for other than commercial blocks.

With reference now to FIGS. 17B and 18B, in those geographic areas such as Japan, where commercials, but not regularly scheduled programs, are broadcast in stereo, the presence of a sound multiplex mode signal may be used as yet another factor in determining which segments are commercial candidate segments. In further detail, with reference to FIG. 17B, segments 1, 2, 3, 4, 8 and 9 are segments during which a sound multiplex mode signal is present. This signal presence is used as a factor in determining which of segments 1 through 10 are commercial candidate segments. Similarly, with reference to FIG. 18B, segments 1, 2, 3, 4, 7, 8, 9 and 10 are segments during which a sound multiplex mode signal is present. This signal presence is also used as a factor in determining which of segments 1 through 10 are commercial candidate segments. Where the presence or non-presence of a sound multiplex mode signal is not indicative of a commercial, the sound multiplex mode signal is not used to determine which segments are commercial candidate segments,.

Figure 19:
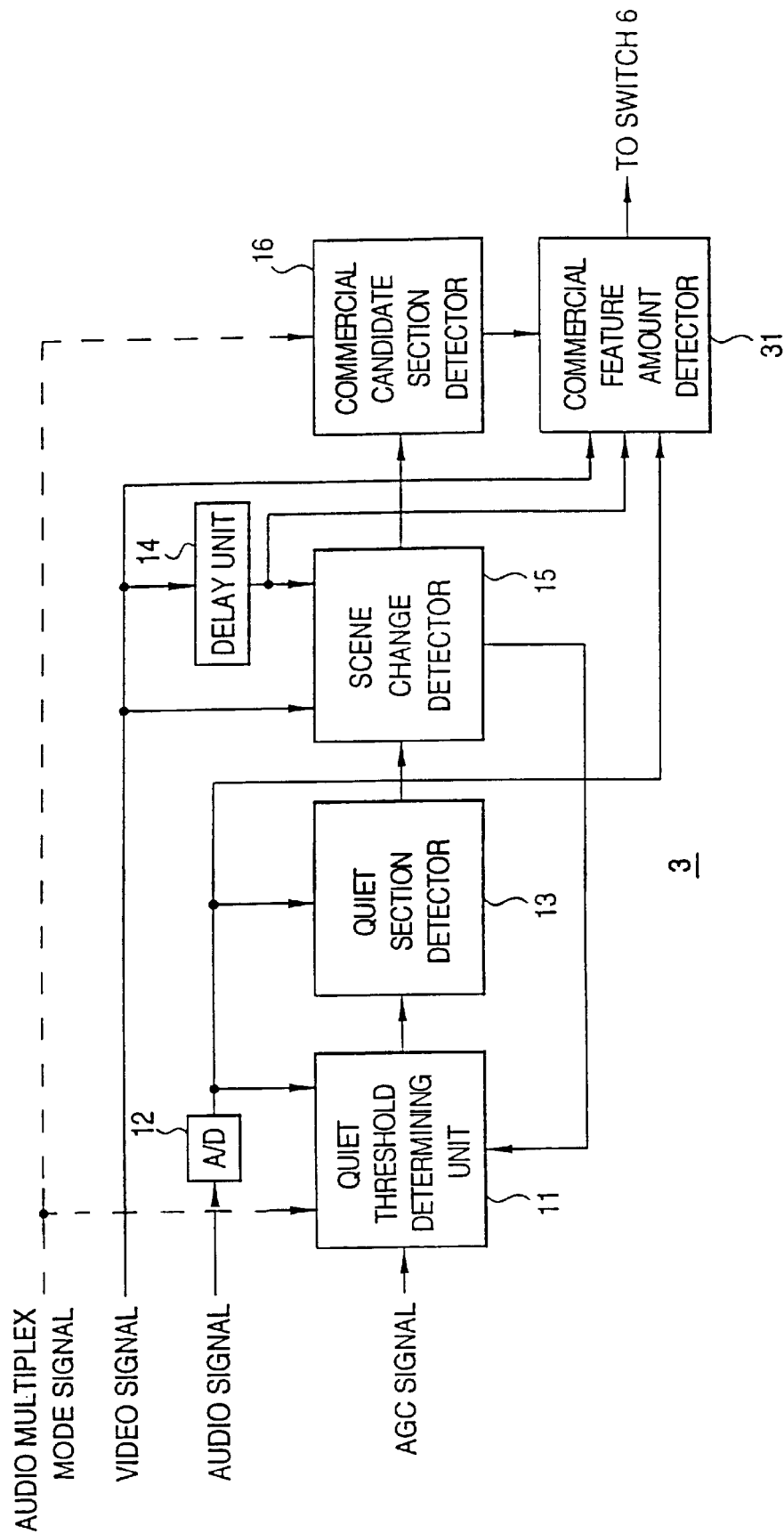
FIG. 19 is a block diagram showing a third embodiment of the commercial detector 3 of FIG. 1.

Next, a third embodiment of the commercial detector 3 will be described with reference to FIG. 19. In this embodiment, the commercial characteristic amount detector 31 is added to the first configuration example shown in FIG. 2. To the commercial characteristic amount detector 31 are supplied two continuous frame images (image signals), digitized sound signals, information (FIG. 11) stored in the memory internal to the commercial candidate segment detector 16, and information of commercial candidate segments detected by the commercial candidate segment detector 16. The commercial characteristic amount detector 31 judges whether the supplied information has various characteristics of commercial, and detects commercial segments based on the result. Furthermore, the commercial characteristic amount detector 31 outputs a control signal to the switch 6 in response to the detection result.

The operation of the commercial characteristic amount detector 31 will be described with reference to the flowchart of FIG. 20. The characteristic amount detection processing is performed for each of commercial candidate segments detected by the commercial candidate segment detector 16.

In step S41, the commercial characteristic amount detector 31 initializes an evaluation value to 0. In step S42, the commercial characteristic amount detector 31 counts the number of scene changes in a commercial candidate segment input from the commercial characteristic amount detector 31 and judges whether the number of scene changes is greater than or equal to a predetermined threshold value (e.g., five times per 15 seconds). If it judges that a counted scene change count is greater than or equal to the predetermined threshold value, it adds 1 to the evaluation value. If it is judged that a counted scene change count is smaller than the predetermined threshold value, however, no addition is made to the evaluation value. This processing is based on the general characteristic that scene changes often take place in a commercial.

In step S43, the commercial characteristic amount detector 31 detects the periodicity of a sound signal of a commercial candidate segment. The sound signal periodicity detection processing is based on the general characteristic that background music is used in a commercial.

Figure 21:
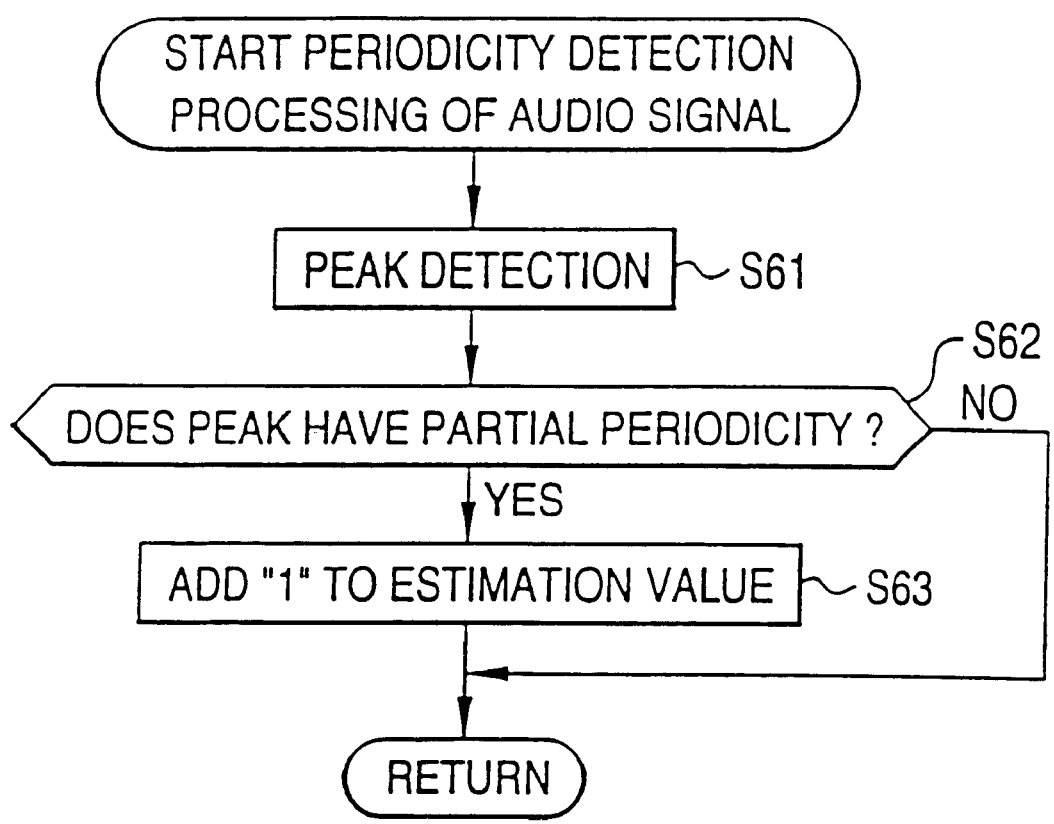
FIG. 21 is a flowchart for explaining periodicity detection processing of a sound signal of step S43 of FIG. 20.
Figure 22:
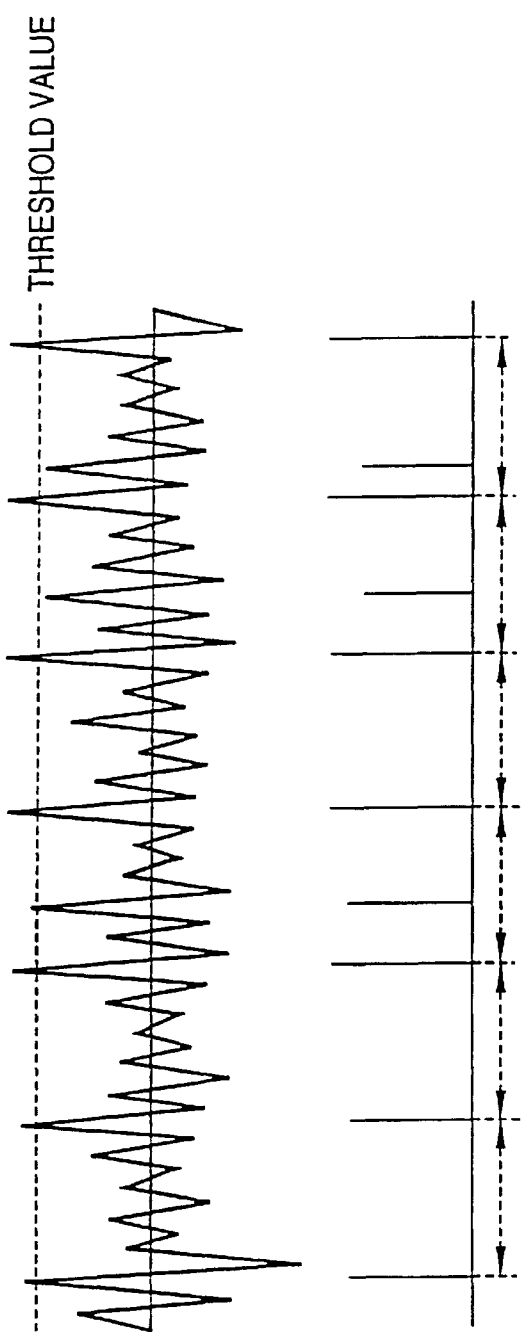
FIG. 22A and 22B are diagrams for explaining periodicity detection processing of a sound signal. 20.

The sound signal periodicity detection processing will be described with reference to the flowchart of FIG. 21. In step S61, the commercial characteristic amount detector 31, detects as peaks points as illustrated in FIG. 22A where the level of a sound signal input from the A/D converter 12 is greater than or equal to a predetermined threshold value (FIG. 22B). FIG. 22A illustrates an analog representation of a sound signal.

In step S62, the commercial characteristic amount detector 31 judges whether the peaks detected in step S61 have periodicity longer than a predetermined period (several seconds). To judge periodicity, for example, FFT (Fast Fourier Transform) may be used or simply the interval of peaks may be measured. If it is judged that the detected peaks have periodicity longer than the predetermined period, control goes to step S63.

In step S63, the commercial characteristic amount detector 31 adds 1 to the evaluation value.

In step S62, if it is judged that the detected peaks do not have periodicity longer than the predetermined period, since no addition is made to the evaluation value, step S63 is skipped.

Figure 20:
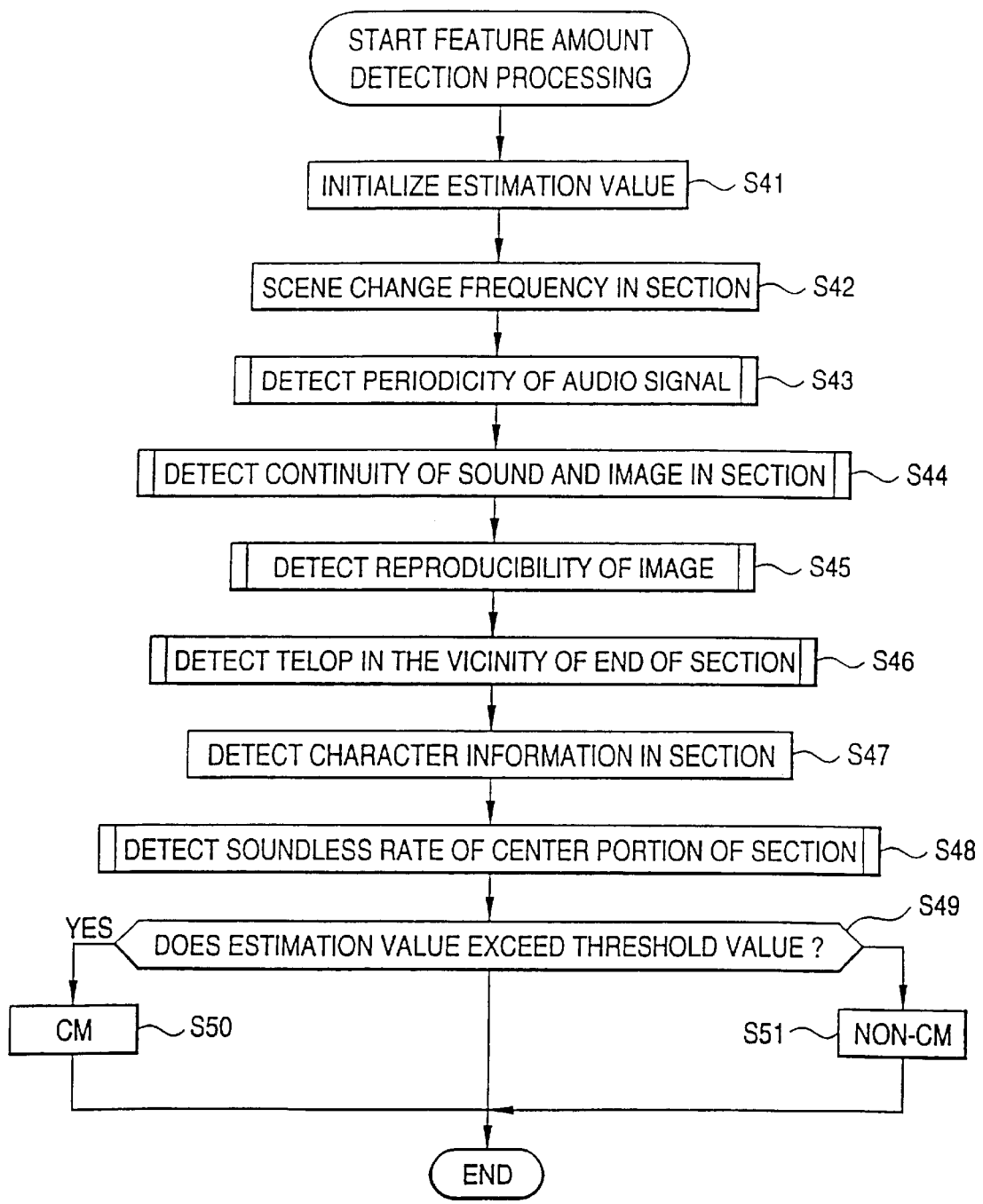
FIG. 20 is a flowchart for explaining the operation of a commercial characteristic amount detector 31 of FIG. 19.
Figure 23:
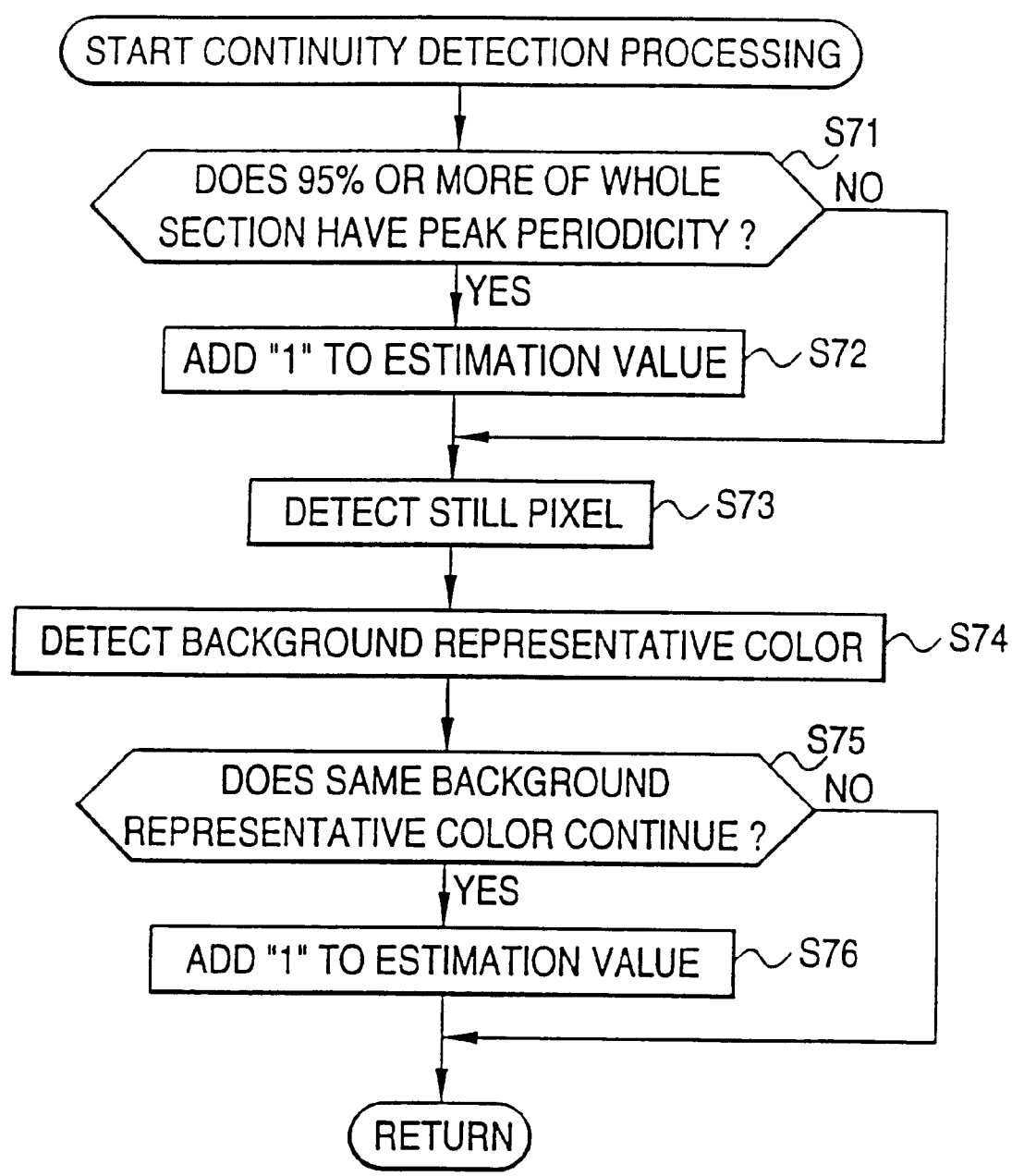
FIG. 23 is a flowchart for explaining continuity detection processing of step S44 of FIG. 20.

Control returns to step S44 of FIG. 20. In step S44, the commercial characteristic amount detector 31 detects continuity of sound and image signals in commercial candidate segments. The continuity detection processing will be described with reference to the flowchart of FIG. 23.

In step S71, the commercial characteristic amount detector 31 judges whether the periodicity of peaks of sound signal lasts for 95% or more of time of a commercial candidate segment. The duration of periodicity of peaks is measured using information obtained in step S43 described above. If it is judged that the periodicity of peaks of sound signal lasts for 95% or more of time of a commercial candidate segment, control goes to step S72.

In step S72, the commercial characteristic amount detector 31 adds 1 to the evaluation value.

In step S73, the commercial characteristic amount detector 31 calculates the differences between the pixel values of corresponding pixels of two consecutive images, and detects pixels having a difference not greater than a predetermined threshold value, namely, pixels that are unchanged between the two images. In step S74, the commercial characteristic amount detector 31 creates a histogram of the pixel values of pixels detected in step S73 and detects a pixel value indicating the maximum value as a typical color of background. Processing of steps S73 and S74 is performed repeatedly at a predetermined interval.

In step S75, the commercial characteristic amount detector 31 references a plurality of typical colors of background detected in step S74 and judges whether the same pixel value is detected continuously as a typical color of background. If it is judged that the same pixel value is detected continuously as a typical color of background, control goes to step S76.

In step S76, the commercial characteristic amount detector 31 adds 1 to the evaluation value.

If it is judged in step S71 that the periodicity of peaks of sound signal does not last for 95% or more of time of a commercial candidate segment, since no addition is made to the evaluation value, step S72 is skipped.

If it is judged in step S75 that the same pixel value is not detected continuously as a typical color of background, since no addition is made to the evaluation value, step S76 is skipped.

Control returns to step S45 of FIG. 20. In step S45, the commercial characteristic amount detector 31 detects repetition of images. The repetition detection processing is based on the general characteristic that same images are repeated in a commercial, for example, such as a ketchup commercial of 15 seconds composed of a green wood scene (3 seconds), a blue sky scene (2 seconds), a red ketchup scene (3 seconds), a green wood scene (2 seconds), and a red ketchup scene (3 seconds).

Figure 24:
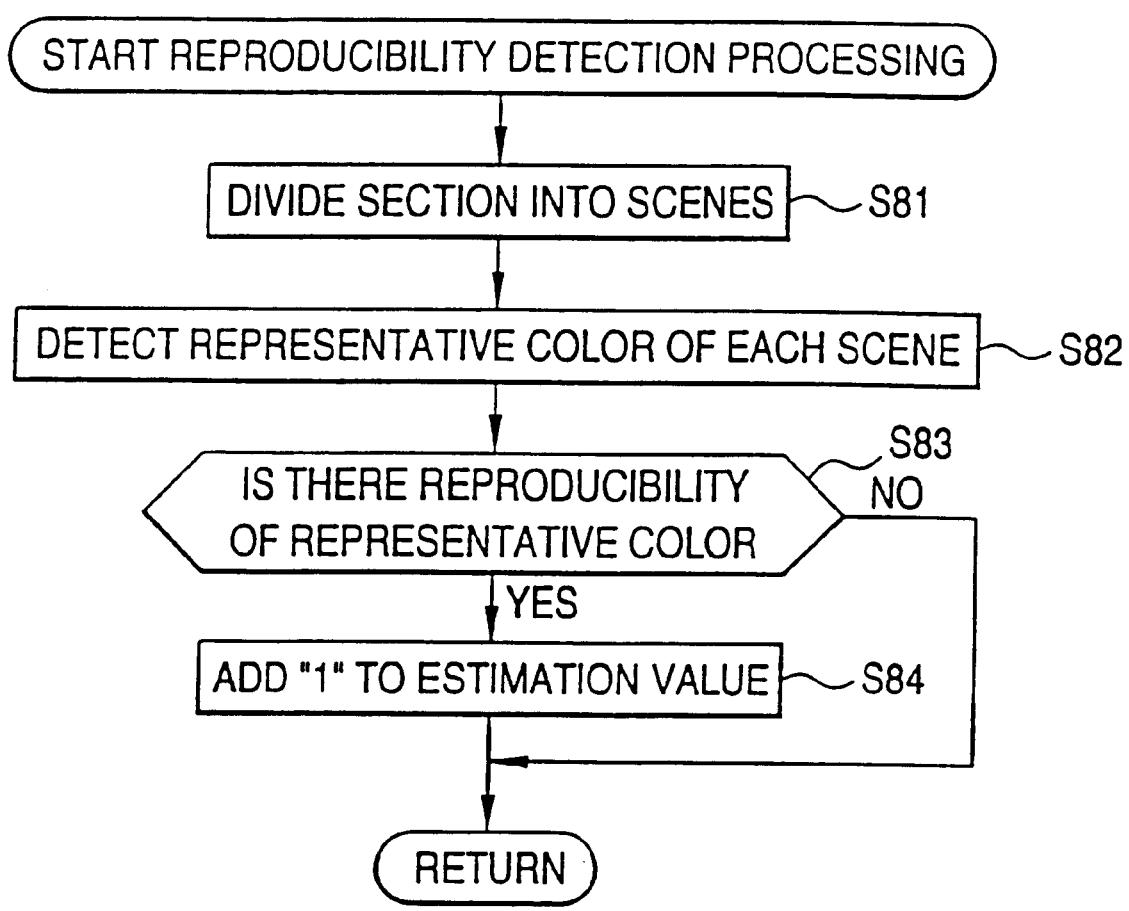
FIG. 24 is a flowchart for explaining repetition detection processing of step S45 of FIG. 20.

The image repetition detection processing will be described with reference to the flowchart of FIG. 24. In step S81, the commercial characteristic amount detector 31 separates commercial candidate segments at scene change points. In step S82, the commercial characteristic amount detector 31 creates a histogram of pixel values of scenes separated in step S81 with 16 levels of gray and detects a pixel value indicating a maximum value as a typical color of the scene.

In step S83, the commercial characteristic amount detector 31 judges whether typical colors of scenes are reproduced in commercial candidate segments (whether same typical colors are detected in different scenes). If it is judged that typical colors of scenes are reproduced, control goes to step S84.

In step S84, the commercial characteristic amount detector 31 adds 1 to the evaluation value.

If it is judged in step S83 that typical colors of scenes are not reproduced, since no addition is made to the evaluation value, step S84 is skipped.

Control returns to step S46 of FIG. 20. In step S46, the commercial characteristic amount detector 31 detects a telop shown in FIG. 26A. A "telop" is an image that is integrated within or superimposed on a television image signal. Such images include, but are not limited to, logos (such as that of a sponsor), captions or other textual or graphic visual communication. The telop detection processing is based on the general characteristic that a telop is displayed at the end of a commercial.

Figure 25:
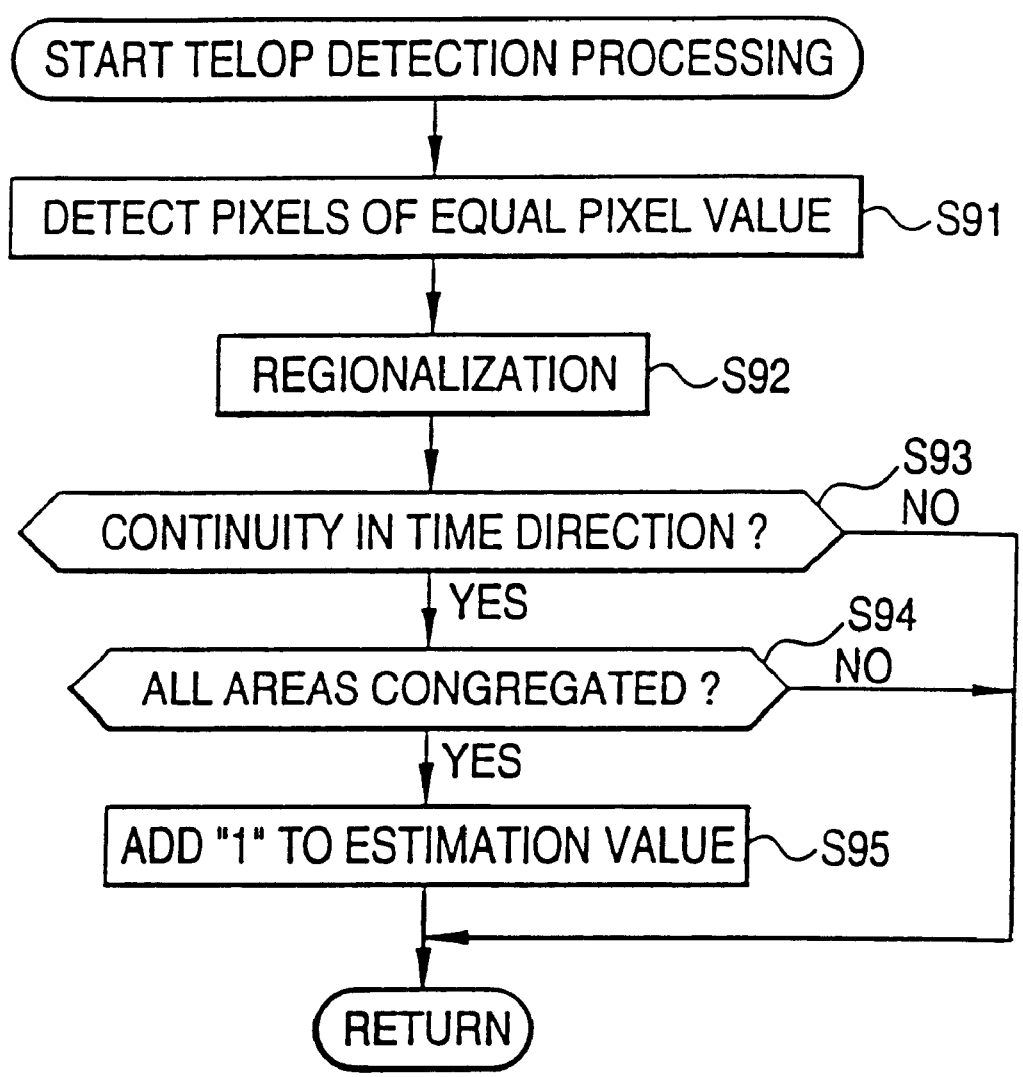
FIG. 25 is a flowchart for explaining telop detection processing of step S46 of FIG. 20.

The telop detection processing will be described with reference to the flowchart of FIG. 25. In step S91, the commercial characteristic amount detector 31, in each frame image at a predetermined time period (e.g., 5 seconds) near the end of commercial candidate segments, detects more adjacent pixels having an equal pixel value than a predetermined number, as shown in FIG. 26B.

Figure 26:
FIGS. 26A to 26C are diagrams for explaining telop detection processing.
Figure 26:
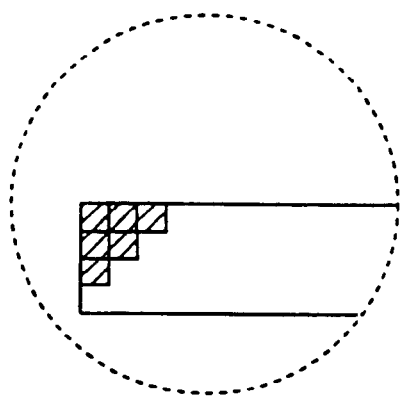
Figure 26:
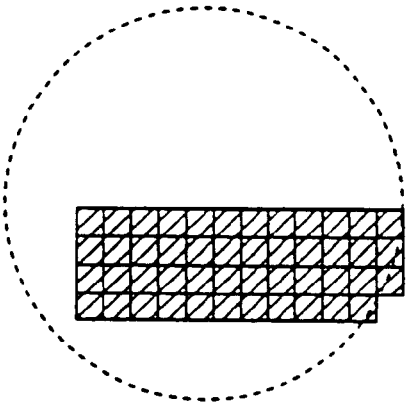

In step S92, the commercial characteristic amount detector 31, as shown in FIG. 26C, searches for pixels having the same pixel value as the pixels detected in step S91 and creates an area for them.

In step S93, the commercial characteristic amount detector 31 judges whether the area obtained in step S92 is continuous in time direction (whether the same area exists in preceding and following frames). If it is judged that the area is continuous in time direction, control goes to step S94.

In step S94, the commercial characteristic amount detector 31 detects the barycenters (that is, the centers of gravity) of all areas on the image, calculates the average of distances between the barycenters and points on the areas, and compares the average with a predetermined threshold value, thereby judging whether the areas are dense. If it is judged that the areas are dense, control goes to step S95.

In step S95, the commercial characteristic amount detector 31 adds 1 to the evaluation value.

If it is judged in step S93 that the area is not continuous in time direction, since no addition is made to the evaluation value, step S95 is skipped.

Control returns to step S47 of FIG. 20. In step S47, the commercial characteristic amount detector 31, using the same method as in the above described telop detection processing, judges whether characters (including a telop) exist on the image for a longer time than a predetermined time in all segments from the start to the end of commercial candidate segments. If it is judged that characters (including a telop) exist on the image for a longer time than a predetermined time, 1 is added to the evaluation value. To the contrary, it is judged that characters (including a telop) do not exist on the image for a longer time than a predetermined time, no addition is made to the evaluation value. This processing is based on the general characteristic that characters are displayed in a commercial.

Figure 27:
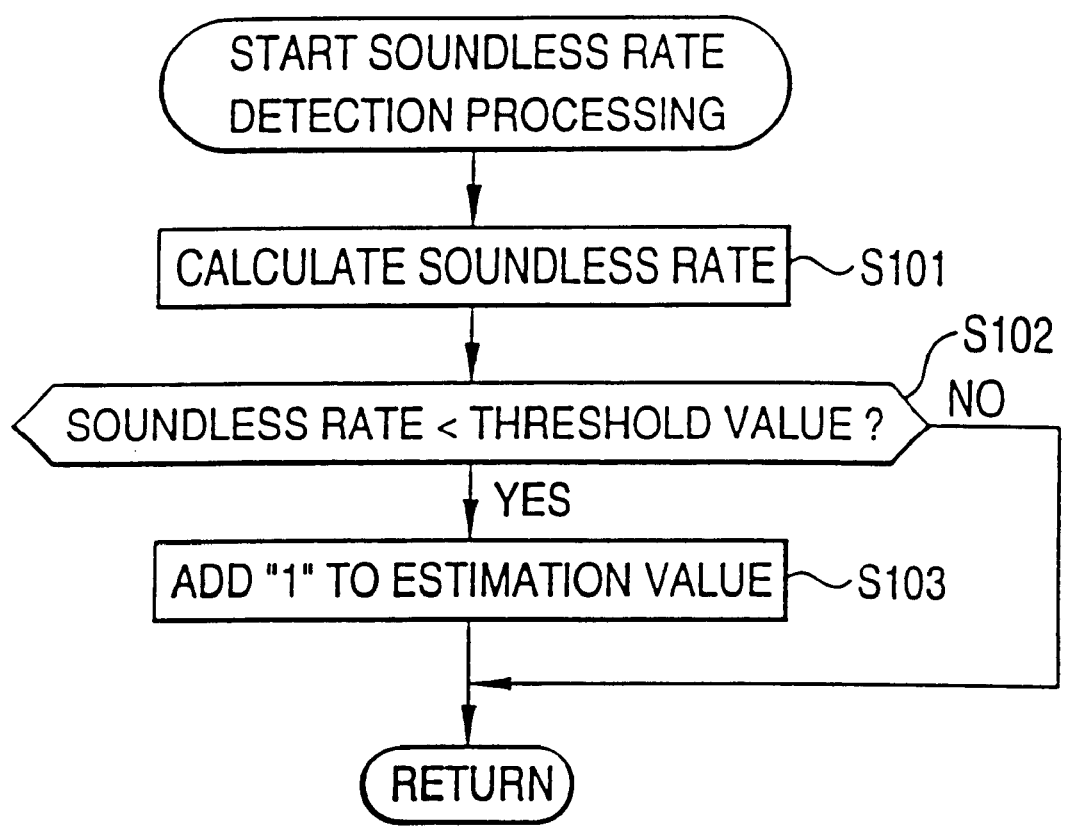
FIG. 27 is a flowchart for explaining silence ratio detection processing of step S48 of FIG. 20.

In step S48, the commercial characteristic amount detector 31 detects the ratio of silent segments in commercial candidate segments, excluding the starting point and ending point. The silence ratio detection processing is based on the general characteristic that not many silent segments appear in a commercial. Silence ratio detection processing will be described with reference to the flowchart of FIG. 27.

Figure 28:
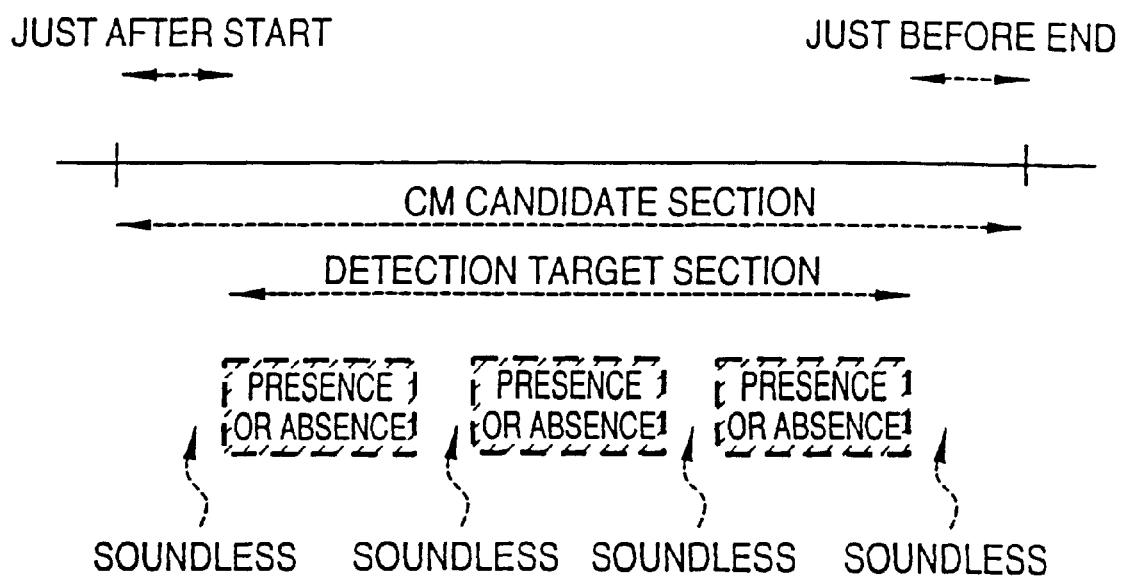
FIG. 28 is a diagram for explaining silence ratio detection processing.

In step S101, the commercial characteristic amount detector 31 reads information (FIG. 11) stored in the memory internal to the commercial candidate segment detector 16 and detects the number of frames in silent segments in commercial candidate segments, excluding the starting point and ending point, as shown in FIG. 28. Moreover, the commercial characteristic amount detector 31 divides the number of frames in the detected silent segments by the number of all frames constituting the commercial candidate segments, thereby calculating a silence ratio.

In step S102, the commercial characteristic amount detector 31 judges whether the silence ratio calculated in step S101 is smaller than a prescribed threshold value. If it is judged that the silence ratio is smaller than the prescribed value, control goes to step S103.

In step S103, the commercial characteristic amount detector 31 adds 1 to the evaluation value.

If it is judged in step S102 that the silence ratio is not smaller than the prescribed threshold value, since no addition is made to the evaluation value, step S103 is skipped.

Control returns to step S49 of FIG. 20. In step S49, the commercial characteristic amount detector 31 judges whether the evaluation value is greater than the prescribed threshold value. If it is judged that the evaluation value is greater than the prescribed threshold value, control goes to step S50. In step S50, the commercial characteristic amount detector 31 judges the commercial candidate segments as commercial segments.

If it is judged in step S49 that the evaluation value is not greater than the prescribed threshold value, control goes to step S51. In step S51, the commercial characteristic amount detector 31 judges that the commercial candidate segments are not commercial segments.

In response to the judgment result, the commercial characteristic amount detector 31 outputs a control signal of 1 to the switch 6 for commercial segments and a control signal of 0 to the switch 6 for other than commercial segments.

In this manner, in the video recorder (FIG. 1) of this embodiment, only programs of television broadcasts are recorded on the magnetic tape 8 and commercials are not recorded. Therefore, reproducing the magnetic tape 8 continuously displays only programs.

Figure 29:
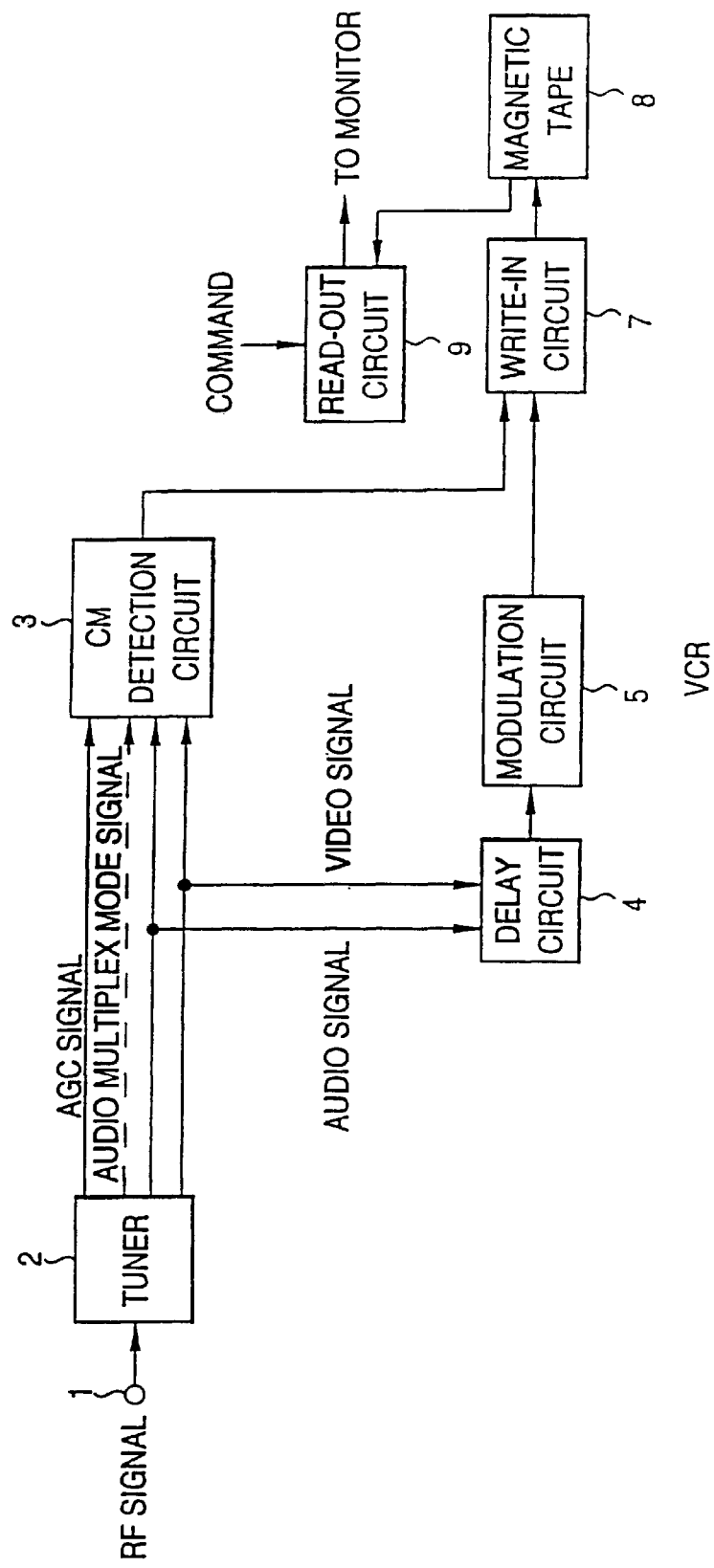
FIG. 29 is a block diagram showing a second embodiment of a video recorder to which the present invention is applied.

Sometimes there is a need for a user to fast forward search through commercials, therefore necessitating the recording of commercials. A description will be made of a second embodiment of a video recorder to which the present invention is applied, with reference to FIG. 29. This embodiment deletes the switch 6 from the configuration example shown in FIG. 1 and supplies the commercial detection result of the commercial detector 3 to the write circuit 7.

In a recording system of this embodiment, the write circuit 7 records all image signals and sound signals (programs and commercials of television broadcasts) input from the modulating circuit 5 on the magnetic tape 8 and records commercial information (commercial time-wise position, etc.) at a predetermined location of the magnetic tape 8, based on information from the commercial detector 3.

In a reproduction system, the read circuit 9, when a command to reproduce only programs (a command to eliminate commercials) is entered from a user, essentially eliminates commercials by fast forwarding based on commercial information recorded at a predetermined location of a magnetic tape 9, and demodulates only programs, thereafter supplying the programs to a monitor (not shown).

It is to be understood that although the present invention is explained in the context of a video cassette recorder, the present invention may be applied to other types of video recorders, for example, video recorders which utilizes disk storage, solid state memory storage or other types of storage media for the recording of data representative of television broadcasts.

Furthermore, the above described different types of processing can be embodied in a computer program and distributed to users through network distribution media such as Internet and digital satellites, as well by way of distribution media comprising information media such as magnetic disk, CD-ROM, DVD-ROM and solid state memories.

As described above, according to an information processing apparatus of the present invention, an information processing method of the present invention, and distribution media of the present invention, since commercials are detected based on silent segments and scene changes, commercials contained in television broadcasts can be correctly detected.

Although only certain embodiments have been described in detail, those having ordinary skill in the art will certainly understand that many modifications are possible without departing from the teachings thereof. All such modifications are intended to be encompassed within the following claims.

We claim:

1. An apparatus for processing a television signal, comprising:

means for receiving the television signal;

means for detecting scene changes from said television signal;

means for detecting a commercial candidate segment from a plurality of contiguous scenes of said television signal, and means for detecting a commercial message according to a frequency of the scene changes, including:
1) means for counting a number of scene changes within a commercial candidate segment; and
2) means for comparing said number of scene changes to a threshold frequency defined by 5 scene changes within 15 seconds of the commercial candidate segment.

2. The apparatus according to claim 1 wherein said means for detecting a commercial candidate segment comprises:

means for receiving information indicative of a sound multiplex mode; and means for detecting the commercial candidate segment according to said sound multiplex mode.

3. The apparatus according to claim 1 wherein said means for detecting a commercial candidate segment comprises:

means for detecting an individual scene or a plurality of consecutive scenes having a substantially predetermined length; and means for detecting the commercial candidate segment according to said detected individual scene or said plurality of consecutive scenes.

4. An apparatus for processing a television signal, comprising:

means for receiving the television signal;

means for detecting scene changes from said television signal;

means for detecting a commercial candidate segment from a plurality of contiguous scenes of said television signal; and means for detecting a commercial message according to a periodicity of a sound signal, including:
1) means for determining a duration during which extremes of sound signal magnitude occur at substantially regular periods within the commercial candidate segment; and
2) means for judging the commercial candidate segment to be at least more likely part of the commercial message when the determined duration exceeds plural seconds.

5. An apparatus for processing a television signal, comprising:

means for receiving the television signal;

means for detecting scene changes from said television signal;

means for detecting a commercial candidate segment from a plurality of contiguous scenes of said television signal; and means for detecting a commercial message according to a continuity of at least one of a sound signal and image signal, including:
1) means for determining a duration during which extremes of sound signal magnitude occur at substantially regular periods;
2) means for determining a color that is dominant across frames of the commercial candidate segment; and
3) means for judging the commercial candidate segment to be at least more likely part of the commercial message when (a) the determined duration exceeds a predetermined threshold percentage of the commercial candidate segment, or when (b) the dominant color is continuously present through a substantial portion of the commercial candidate segment.

6. An apparatus for processing a television signal, comprising:

means for receiving the television signal;

means for detecting scene changes from said television signal;

means for detecting a commercial candidate segment from a plurality of contiguous scenes of said television signal; and means for determining the commercial candidate segment to be at least more likely part of a commercial message according to a repetition of an image signal within the commercial candidate segment, each repetition of the image signal enduring continuously for about two to three seconds.

7. An apparatus for processing a television signal including a commercial message, the apparatus comprising:

means for receiving the television signal; and means for detecting said commercial message according to a silence ratio of a sound signal, the silence ratio calculated as a number of silent frames in a commercial candidate segment divided by a number of all frames in the commercial candidate segment.

8. An apparatus for processing a television signal, comprising:

a tuner for receiving the television signal;

a scene change detector configured to detect scene changes from said television signal;

a commercial candidate segment detector configured to detect a commercial candidate segment from a plurality of contiguous scenes of said television signal;

a commercial message detector configured to detect a commercial message according to a frequency of scene changes, including:
1) a counter configured to count a number of scene changes within the commercial candidate segment; and
2) a comparator configured to compare said number of scene changes with a threshold frequency defined by 5 scene changes within 15 seconds of the commercial candidate segment.

9. The apparatus according to claim 8 wherein said commercial candidate segment detector comprises:

a receiver configured to receive information indicative of a sound multiplex mode according to which the commercial candidate segment is detected.

10. The apparatus according to claim 8 wherein said commercial candidate segment detector comprises:

a scene length detector configured to detect an individual scene or a plurality of consecutive scenes having a substantially predetermined length according to which the commercial candidate segment is detected.

11. An apparatus for processing a television signal, comprising:

a tuner configured to receive the television signal;

a scene change detector configured to detect scene changes from said television signal;

a commercial candidate segment detector configured to detect a commercial candidate segment from a plurality of contiguous scenes of said television signal; and a commercial message detector configured to detect a commercial message according to a periodicity of a sound signal, the commercial message detector including:
1) a duration detector configured to determine a duration during which extremes of sound signal magnitude occur at substantially regular periods within the commercial candidate segment; and
2) a judging element configured to judge the commercial candidate segment to be at least more likely part of the commercial message when the determined duration exceeds plural seconds.

12. An apparatus for processing a television signal, comprising:
a tuner configured to receive the television signal;
a scene change detector configured to detect scene changes from said television signal;
a commercial candidate segment detector configured to detect a commercial candidate segment from a plurality of contiguous scenes of said television signal; and
a commercial message detector configured to detect a commercial message according to a continuity of at least one of a sound signal and image signal, the commercial message detector including:
1) a duration detector configured to determine a duration during which extremes of sound signal magnitude occur at substantially regular periods;
2) a color continuity detector configured to determine a color that is dominant across frames of the commercial candidate segment; and
3) a judging element configured to judge the commercial candidate segment to be at least more likely part of a commercial message when (a) the determined duration exceeds a predetermined threshold percentage of the commercial candidate segment, or when (b) the dominant color is continuously present through a substantial portion of the commercial candidate segment.

13. An apparatus for processing a television signal, comprising:
a tuner configured to receive the television signal;
a scene change detector configured to detect scene changes from said television signal;
a commercial candidate segment detector configured to detect a commercial candidate segment from a plurality of contiguous scenes of said television signal; and
a commercial message determiner configured to determine the commercial candidate segment to be at least more likely part of a commercial message according to a repetition of an image signal within the commercial candidate segment, each repetition of the image signal enduring continuously for about two to three seconds.

14. An apparatus for processing a television signal including a commercial message, the apparatus comprising:
a tuner configured to receive the television signal; and
a commercial message detector configured to detect said commercial message according to a silence ratio of a sound signal, the silence ratio calculated as a number of silent frames in a commercial candidate segment divided by a number of all frames in the commercial candidate segment.

15. A method for processing a television signal, comprising:
receiving the television signal;
detecting scene changes from said television signal;
detecting a commercial candidate segment from a plurality of contiguous scenes of said television signal, and
detecting a commercial message according to a frequency of the scene changes, the commercial candidate message detecting step including:
1) counting a number of scene changes within a commercial candidate segment; and
2) comparing said number of scene changes to a threshold frequency defined by 5 scene changes within 15 seconds of the commercial candidate segment.

16. A program storage device readable by a machine, tangibly embodying a program of instructions executable by the machine to perform the method of claim 15.

17. The program storage device according to claim 16 wherein said step of detecting a commercial candidate segment comprises the steps of:
receiving information indicative of a sound multiplex mode; and
detecting the commercial candidate segment according to said sound multiplex mode.

18. The program storage device according to claim 16 wherein said step of determining a commercial candidate segment comprises the steps of:
detecting an individual scene or a plurality of consecutive scenes having a substantially predetermined length; and
determining the commercial candidate segment according to said detected scene or scenes.

19. The method according to claim 15 wherein said step of detecting a commercial candidate segment comprises the steps of:
receiving information indicative of a sound multiplex mode; and
detecting the commercial candidate segment according to said sound multiplex mode.

20. The method according to claim 15 wherein said step of determining a commercial candidate segment comprises the steps of:
detecting an individual scene or a plurality of consecutive scenes having a substantially predetermined length; and
detecting the commercial candidate segment according to said detected scene or scenes.

21. A method for processing a television signal, comprising:
receiving the television signal;
detecting scene changes from said television signal;
detecting a commercial candidate segment from a plurality of contiguous scenes of said television signal; and
detecting a commercial message according to a periodicity of a sound signal, the commercial message detecting step including:
1) determining a duration during which extremes of sound signal magnitude occur at substantially regular periods within the commercial candidate segment; and
2) judging the commercial candidate segment to be at least more likely part of the commercial message when the determined duration exceeds plural seconds.

22. A program storage device readable by a machine, tangibly embodying a program of instructions executable by the machine to perform the method of claim 21.

23. A method for processing a television signal, comprising:

receiving the television signal;

detecting scene changes from said television signal;

detecting a commercial candidate segment from a plurality of contiguous scenes of said television signal; and detecting a commercial message according to a continuity of at least one of a sound signal and image signal, the commercial message detecting step including:

1) determining a duration during which extremes of sound signal magnitude occur at substantially regular periods;

2) determining a color that is dominant across frames of the commercial candidate segment; and 3) judging the commercial candidate segment to be at least more likely part of the commercial message when (a) the determined duration exceeds a predetermined threshold percentage of the commercial candidate segment, or when (b) the dominant color is continuously present through a substantial portion of the commercial candidate segment.

24. A program storage device readable by a machine, tangibly embodying a program of instructions executable by the machine to perform the method of claim 22.

25. A method for processing a television signal, comprising:

receiving the television signal;

detecting scene changes from said television signal;

detecting a commercial candidate segment from a plurality of contiguous scenes of said television signal; and determining the commercial candidate segment to be at least more likely part of a commercial message according to a repetition of an image signal within the commercial candidate segment, each repetition of the image signal enduring continuously for about two to three seconds.

26. A program storage device readable by a machine, tangibly embodying a program of instructions executable by the machine to perform the method of claim 25.

27. A method for processing a television signal including a commercial message, the method comprising:

receiving the television signal; and detecting said commercial message according to a silence ratio of a sound signal, the silence ratio calculated as a number of silent frames in a commercial candidate segment divided by a number of all frames in the commercial candidate segment.

28. A program storage device readable by a machine, tangibly embodying a program of instructions executable by the machine to perform the method of claim 27.

29. A computer program comprising program code adapted to perform the steps of any of claims 5–27 when said program is run on a computer.

30. A computer program according to claim 29 wherein the computer program is embodied on a computer readable medium.

31. An apparatus for processing a television signal having an image signal and a sound signal, comprising:

means for determining a threshold indicating a silence in said sound signal;

means for detecting a silent segment in the sound signal in a plurality of contiguous scenes based upon said threshold;

means for detecting scene changes in said image signal;

means for detecting commercial candidate segments based upon the detected silent segment, a frequency of the detected scene changes and a sound signal multiplex mode signal; and means for detecting which of the commercial candidate segments is a commercial based upon a silence ratio of the sound signal and a repetition of the image signal, the silence ratio calculated as a number of silent frames in a commercial candidate segment divided by a number of all frames in the commercial candidate segment, and each repetition of the image signal enduring continuously for about two to three seconds.

32. An apparatus for processing a television signal having an image signal and a sound signal, comprising:

a determiner for determining a threshold indicating a silence in said sound signal;

a first detector detecting a silent segment in the sound signal in a plurality of contiguous scenes based upon said threshold;

a second detector for detecting scene changes in said image signal;

a third detector for detecting commercial candidate segments based upon the detected silent segment, a frequency of the detected scene changes and a sound signal multiplex mode signal; and a fourth detector for detecting which of the commercial candidate segments is a commercial based upon a silence ratio of the sound signal and a repetition of the image signal, the silence ratio calculated as a number of silent frames in a commercial candidate segment divided by a number of all frames in the commercial candidate segment, and each repetition of the image signal enduring continuously for about two to three seconds.

33. A method for processing a television signal having an image signal and a sound signal, comprising the steps of:

determining a threshold indicating a silence in said sound signal;

detecting a silent segment in the sound signal in a plurality of continuous scenes based upon said threshold;

detecting scene changes in said image signal;

detecting commercial candidate segments based upon the detected silent segment, a frequency of the detected scene changes and a sound signal multiplex mode signal; and detecting which of the commercial candidate segments is a commercial based upon a silence ratio of the sound signal and a repetition of the image signal, the silence ratio calculated as a number of silent frames in a commercial candidate segment divided by a number of all frames in the commercial candidate segment, and each repetition of the image signal enduring continuously for about two to three seconds.

34. A program storage device readable by a machine, tangibly embodying a program of instructions executable by the machine to perform method steps for processing a television signal, the method steps comprising:

determining a threshold indicating a silence in said sound signal;

detecting a silent segment in the sound signal in a plurality of continuous scenes based upon said threshold;

detecting scene changes in said image signal;

detecting commercial candidate segments based upon the detected silent segment, a frequency of the detected scene changes and a sound signal multiplex mode signal; and detecting which of the commercial candidate segments is a commercial based upon a silence ratio of the sound signal and a repetition of the image signal, the silence ratio calculated as a number of silent frames in a commercial candidate segment divided by a number of all frames in the commercial candidate segment, and each repetition of the image signal enduring continuously for about two to three seconds.

35. An apparatus for processing a television signal, comprising:

a circuit configured for receiving the television signal;

a circuit configured for detecting scene changes from said television signal; and a circuit configured for detecting a commercial candidate segment from a plurality of contiguous scenes of said television signal;

a circuit configured for detecting a commercial message according to a frequency of scene changes, including:
1) a circuit configured for counting a number of scene changes within the commercial candidate segment; and
2) a circuit configured for comparing said number of scene changes with a threshold frequency defined by 5 scene changes within 15 seconds of the commercial candidate segment.

36. The apparatus according to claim 35 wherein said circuit configured for detecting a commercial candidate segment comprises:

a circuit configured for receiving information indicative of a sound multiplex mode; and a circuit configured for detecting the commercial candidate segment according to said sound multiplex mode.

37. The apparatus according to claim 35 wherein said circuit configured for detecting a commercial candidate segment comprises:

a circuit configured for detecting an individual scene or a plurality of consecutive scenes having a substantially predetermined length; and a circuit configured for detecting the commercial candidate segment according to said detected individual scene or said plurality of consecutive scenes.

38. An apparatus for processing a television signal, comprising:

a circuit configured for receiving the television signal;

a circuit configured for detecting scene changes from said television signal; and a circuit configured for detecting a commercial candidate segment from a plurality of contiguous scenes of said television signal;

a circuit configured for detecting a commercial message according to a periodicity of a sound signal, including:
1) a circuit configured for determining a duration during which extremes of sound signal magnitude occur at substantially regular periods within the commercial candidate segment; and
2) a circuit configured for judging the commercial candidate segment to be at least more likely part of the commercial message when the determined duration exceeds plural seconds.

39. An apparatus for processing a television signal, comprising:

a circuit configured for receiving the television signal;

a circuit configured for detecting scene changes from said television signal; and a circuit configured for detecting a commercial candidate segment from a plurality of contiguous scenes of said television signal;

a circuit configured for detecting a commercial message according to a continuity of at least one of a sound signal and image signal, including:
1) a circuit configured for determining a duration during which extremes of sound signal magnitude occur at substantially regular periods;
2) a circuit configured for determining a color that is dominant across frames of the commercial candidate segment; and
3) a circuit configured for judging the commercial candidate segment to be at least more likely part of a commercial message when (a) the determined duration exceeds a predetermined threshold percentage of the commercial candidate segment, or when (b) the dominant color is continuously present through a substantial portion of the commercial candidate segment.

40. An apparatus for processing a television signal, comprising:

a circuit configured for receiving the television signal;

a circuit configured for detecting scene changes from said television signal; and a circuit configured for detecting a commercial candidate segment from a plurality of contiguous scenes of said television signal;

a circuit configured for determining the commercial candidate segment to be at least more likely part of a commercial message according to a repetition of an image signal within the commercial candidate segment, each repetition of the image signal enduring continuously for about two to three seconds.

41. An apparatus for processing a television signal, comprising:

a circuit configured for receiving the television signal; and a circuit configured for detecting said commercial message according to a silence ratio of a sound signal, the silence ratio calculated as a number of silent frames in a commercial candidate segment divided by a number of all frames in the commercial candidate segment.

* * * * *

UNITED STATES PATENT AND TRADEMARK OFFICE
CERTIFICATE OF CORRECTION

PATENT NO.    : 6,449,021 B1
DATED         : September 10, 2002
INVENTOR(S)   : Masashi Ohta et al.

It is certified that error appears in the above-identified patent and that said Letters Patent is hereby corrected as shown below:

Column 1,
Line 8, change "08/448,836" to -- 09/448,836 --.

Column 2,
Line 47, change "viewer utilize" to -- viewer to utilize --.

Column 3,
Lines 11, 25 and 39, change "a image" to -- an image --.

Column 4,
Line 51, change "signal. 20" to -- signal of Fig. 20. --.

Column 7,
Line 1, change "exists.but" to -- exists but --.

Column 8,
Line 23, change "In-step" to -- In step --.

Column 9,
Line 19, change "S4" to -- S4, --.
Line 50, change "Next, an another" to -- Next, another --.

Column 10,
Line 28, change "the-commercial" to -- the commercial --.
Line 32, change "segments-and" to -- segments and --.

Column 12,
Line 27, change "A." to -- A --.

UNITED STATES PATENT AND TRADEMARK OFFICE
CERTIFICATE OF CORRECTION

PATENT NO.    : 6,449,021 B1
DATED         : September 10, 2002
INVENTOR(S)   : Masashi Ohta et al.

It is certified that error appears in the above-identified patent and that said Letters Patent is hereby corrected as shown below:

<u>Column 21,</u>
Line 22, change "22" to -- 23 --.
Line 50, change "5-27" to -- 15-27 --.

Signed and Sealed this

Tenth Day of June, 2003

JAMES E. ROGAN
*Director of the United States Patent and Trademark Office*